(12) United States Patent
Yusa et al.

(10) Patent No.: US 12,516,143 B2
(45) Date of Patent: Jan. 6, 2026

(54) POLYSTYRENE-BASED POLYAMPHOLYTE HAVING UPPER CRITICAL SOLUTION TEMPERATURE, AND APPLICATION FOR SAME

(71) Applicant: TOSOH FINECHEM Corporation, Shunan (JP)

(72) Inventors: Shinichi Yusa, Himeji (JP); Kanta Sharker Komol, Himeji (JP); Yuki Ohara, Himeji (JP); Yusuke Shigeta, Shunan (JP); Shinji Ozoe, Shunan (JP)

(73) Assignee: TOSOH FINECHEM Corporation, Shunan (JP)

( * ) Notice: Subject to any disclaimer, the term of this patent is extended or adjusted under 35 U.S.C. 154(b) by 157 days.

(21) Appl. No.: 17/479,218

(22) Filed: Sep. 20, 2021

(65) Prior Publication Data

US 2022/0073661 A1 Mar. 10, 2022

Related U.S. Application Data

(63) Continuation of application No. PCT/JP2019/026555, filed on Jul. 4, 2019.

(30) Foreign Application Priority Data

Mar. 20, 2019 (JP) .................. 2019-053241

(51) Int. Cl.
*C08F 226/06* (2006.01)
*C08F 212/14* (2006.01)

(52) U.S. Cl.
CPC .......... *C08F 226/06* (2013.01); *C08F 212/28* (2020.02); *C08F 212/30* (2020.02); *C08F 212/22* (2020.02)

(58) Field of Classification Search
CPC ..... C08F 212/28; C08F 212/30; C08F 226/06
See application file for complete search history.

(56) References Cited

U.S. PATENT DOCUMENTS 4,739,834 A * 4/1988 Peiffer .................. C09K 8/64
166/308.4
2007/0259452 A1 11/2007 Schlenoff
(Continued)

FOREIGN PATENT DOCUMENTS

CN 101987878 A 3/2011
GB 2250515 A 6/1992
(Continued)

OTHER PUBLICATIONS

Bhardwaj, Y.K., et al., "Swelling Behavior of Radiation-Polymerized Polyampholytic Two-Component Gels: Dynamic and Equilibrium Swelling Kinetics," Journal of Applied Polymer Science, vol. 88, 730-742 (2003).
(Continued)

*Primary Examiner* — Joseph S Del Sole
*Assistant Examiner* — David L Miller
(74) *Attorney, Agent, or Firm* — Volpe Koenig

(57) ABSTRACT

Provided is a novel polystyrene-based polyampholyte having upper critical solution temperature (UCST)-type thermoresponsiveness and a method for producing the same. When monomers having halogenated vinylbenzyl trialkyl ammonium and p-styrenesulfonate as main components are radically polymerized in an aqueous solvent, a polyampholyte having an upper critical solution temperature is produced by optimizing the mole ratio between cationic groups and anionic groups and the amount of a radical initiator and a chain transfer agent to be added to thereby control the copolymer composition and the molecular weight.

3 Claims, 8 Drawing Sheets

(56) References Cited

U.S. PATENT DOCUMENTS

2009/0166295 A1* 7/2009 Chen .................. C08J 5/20
                                                          521/29
2013/0240444 A1  9/2013 Jung et al.
2021/0253753 A1* 8/2021 Gong .................. A61K 9/06

FOREIGN PATENT DOCUMENTS

| JP | 52-22091 A    | 2/1977 |
| JP | 06-220678 A   | 8/1994 |
| JP | 2006-030477 A | 2/2006 |
| JP | 4069221 B2    | 4/2008 |
| JP | 2013-194240 A | 9/2013 |
| JP | 6125863 B2    | 5/2017 |
| JP | 2018-023933 A | 2/2018 |

OTHER PUBLICATIONS

Giebeler, E., et al., "ABC triblock polyampholytes containing a neutral hydrophobic block, a polyacid and a polybase," Macromol. Chem. Phys. 198, 3815-3825 (1997).
Yasushi, Maeda, "Koubunshi," vol. 51, No. 11, 2002, pp. 889-893.
Seuring, J., et al., "First Example of a Universal and Cost-Effective Approach: Polymers with Tunable Upper Critical Solution Temperature in Water and Electrolyte Solution," Macromolecules 2012, 45, pp. 3910-3918.
Chinese Office Action issued on Dec. 12, 2023 for Chinese Patent Application No. 201980094306.9.
Wu Qiuyan, Zhang Zhongguo, Yang Liu, et al., Review on draw solution in forward osmosis process[J]., Environmental Science & Technology, 2015, 38(6):139-145.

* cited by examiner

CHEMICAL SHIFT (ppm)

FIG. 6A
FIG. 6B
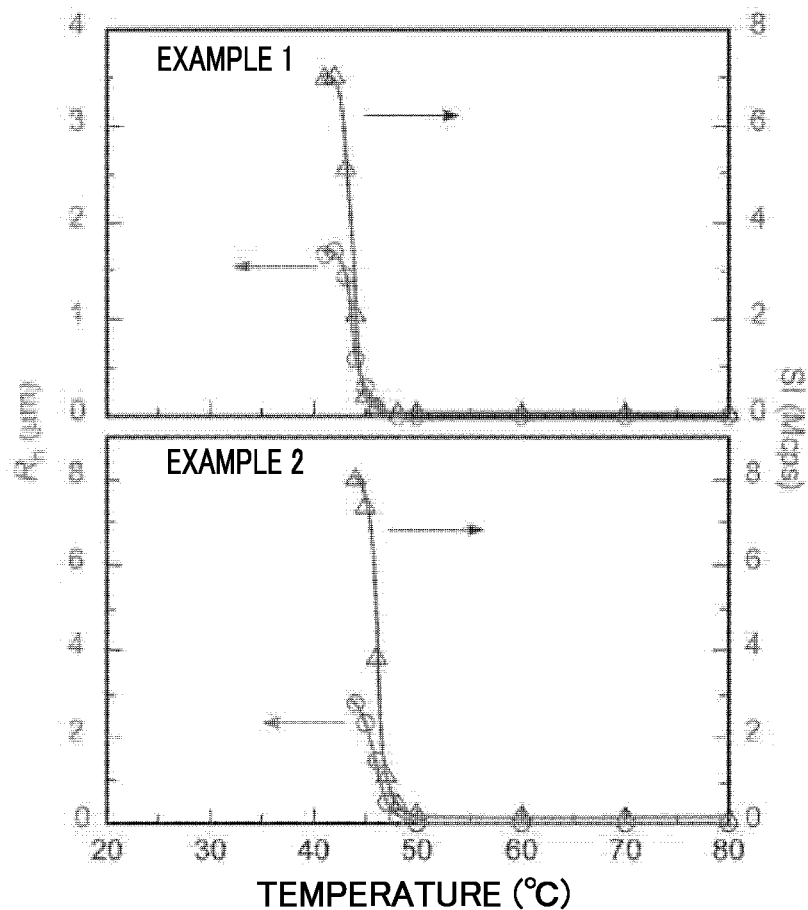
FIG. 7
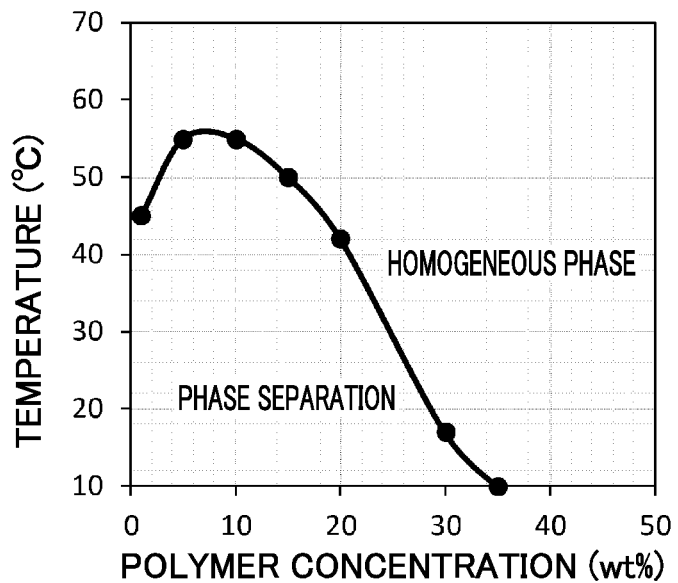

POLYSTYRENE-BASED POLYAMPHOLYTE HAVING UPPER CRITICAL SOLUTION TEMPERATURE, AND APPLICATION FOR SAME

TECHNICAL FIELD

The present invention relates to novel polystyrene-based polyampholytes that exhibit an upper critical solution temperature (UCST), the polyampholytes being useful as drug delivery systems, draw solutions for forward osmosis membrane method water treatment systems, and the like, and to a draw solution for forward osmosis membrane method water treatment systems including a polystyrene-based polyampholyte having thermoresponsiveness as an application thereof.

BACKGROUND ART

Stimulus-responsive polymers are materials that change their physical and chemical properties in response to an external stimulus such as temperature, pH, ionic strength, light irradiation, application of an electromagnetic field, or the like. In particular, thermoresponsive polymers have been widely studied because of being expected to be applied in fields of drug delivery systems, gene therapy, bioseparation, bioimaging, catheters, artificial muscles, optical devices, catalysts, and forward osmosis membrane method water treatment systems, and the like (e.g., see Patent Document 1 and Patent Document 2).

Among the stimulus-responsive polymers described above, temperature-responsive polymers can be classified into polymers having lower critical solution temperature (LCST) behavior and polymers having upper critical solution temperature (UCST) behavior depending on phase change due to temperature. In 1968, Heskins et al. reported that the LCST of a poly(N-isopropylacrylamide) (hereinafter, abbreviated as P-NIPAM) aqueous solution was observed at about 32° C. This transition temperature is relatively close to the human body temperature, and thus, studies by use of thermoresponsive behavior of P-NIPAM have been widely conducted in the biomedical field. Further, many LCST-type polymers have been reported, such as poly(N-isopropylmethacrylamide), poly(N-vinylcaprolactam), and poly(oligoethylene glycol)acrylate. However, few examples of polymers that exhibit a UCST behavior have been reported.

Polymers that exhibit a UCST dissolve in water on heating, and thus have a possibility of voluntarily controlling release of a drug by a rise in body temperature. Recently, Agarwal et al. have reported that an acrylamide-acrylonitrile copolymer exhibits a UCST for which hydrogen bonding acts as driving force in water. Additionally, zwitterionic polymers including both a cation and an anion on a side chain are known to exhibit a UCST.

For example, poly(N-(3-sulfopropyl)-N-methacroyloxy-ethyl-N,N-dimethylammoniumbetaine) includes cationic ammonium and anionic sulfonate on the same side chain and is said to exhibit a UCST in water due to a strong electrostatic interaction therebetween.

Although most of the studies on thermoresponsive polymers described above are related to applications in the biomedical field, some attempts to utilize the polymers in draw solutions for forward osmosis membrane method water treatment systems have been conducted (e.g., Patent Document 2). However, most of conventional thermoresponsive polymers include a hydrolyzable ester group or amide group. Thus, there has been a problem in that thermoresponsiveness is likely to disappear by hydrolysis (e.g., Non-Patent Documents 1 and 2). Additionally, in the case where the thermoresponsive polymer is nonionic, there has been a problem of an excessively low osmotic pressure for a draw solution for forward osmosis membrane method water treatment systems.

PRIOR ART DOCUMENT

Patent Document

Patent Document 1: Japanese Patent No. 4069221
Patent Document 2: Japanese Patent No. 6125863

Non-Patent Document

Non-Patent Document 1: Maeda Yasushi; Koubunshi, vol. 51, No. 11, 2002, pages 889 to 893
Non-Patent Document 2: Seema Agarwal et al.; Macromolecules, 45, pages 3910 to 3918 (2012)

SUMMARY OF THE INVENTION

Problems to be Solved by the Invention

Most of conventional polymers having an upper critical solution temperature (UCST)-type thermoresponsiveness are those having an easily hydrolyzable ester group or amide group. Accordingly, ionic polymers including no hydrolyzable portion and expected to have a high osmotic pressure have been required.

Means for Solving the Problems

As a result of intensive studies, the present inventors have found that a polystyrene-based polyampholyte including at least one cationic monomer component selected from the group consisting of halogenated 4-vinylbenzyltrialkylammonium, vinylpyridine, and quaternized vinylpyridine and 4-vinylbenzenesulfonate as main components exhibits upper critical solution temperature (hereinafter, abbreviated as UCST)-type thermoresponsiveness at a specific polymer composition and in a specific molecular weight range, thereby having completed the present invention.

That is, the present invention relates to a novel polystyrene-based polyampholyte having UCST-type thermoresponsiveness, comprising the following structural unit (A) and the following structural unit (B), the content of the structural unit (A) being 36 to 64 mol % with respect to the total of the structural units (A) and (B).

Structural Unit (A):
  at least one selected from the group consisting of:
  a vinylbenzyltrialkylammonium structural unit represented by General formula (1)

[Formula 1]

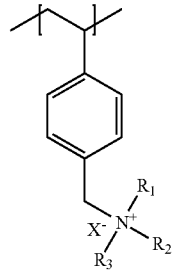

(1)

wherein, in the formula (1), X represents a halogen atom, and $R_1$ to $R_3$ each independently represent a linear or branched alkyl group having 1 to 10 carbon atoms;
a vinylpyridine structural unit represented by General formula (2)
[Formula 2]

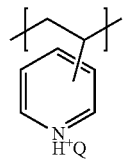

(2)

wherein, in the formula (2), Q represents a halogen ion, $OH^-$, $HSO_4^-$, $NO_3^-$, $R_aSO_3^-$, or $R_aCO_2^-$, and $R_a$ represents an alkyl group having 1 to 3 carbon atoms; and
a quaternized vinylpyridine structural unit represented by General formula (3)
[Formula 3]

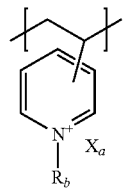

(3)

wherein, in the formula (3), $X_a$ represents a halogen ion or $HSO_4^-$, and $R_b$ represents an alkyl group having 1 to 3 carbon atoms; and
Structural Unit (B):
General Formula (4)
[Formula 4]

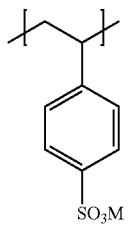

(4)

wherein, in the formula (4), M represents a hydrogen atom, an alkali metal, or an alkali earth metal.

The present invention also relates to a novel polystyrene-based polyampholyte having UCST-type thermoresponsiveness, comprising the following structural unit (C), the following structural unit (D), and the following structural unit (E), the content of the structural unit (C) being 36 to 64 mol % with respect to the total of the structural units (C) and (D), the content of the structural unit (E) being 1 to 50 mol % with respect to the total of the structural units (C) to (E):
Structural Unit (C):
at least one selected from the group consisting of:
a vinylbenzyltrialkylammonium structural unit represented by General formula (5)

[Formula 5]

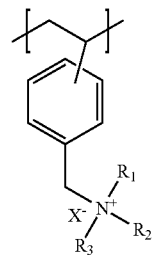

(5)

wherein, in the formula (5), X and $R_1$ to $R_3$ are the same as defined in the above formula (1);
a vinylpyridine structural unit represented by General formula (6)
[Formula 6]

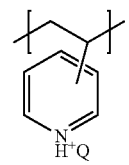

(6)

wherein, in the formula (6), Q is the same as defined in the above formula (2); and
a quaternized vinylpyridine structural unit represented by General formula (7)
[Formula 7]

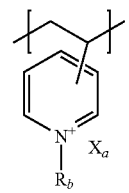

(7)

wherein, in the formula (7), $X_a$ and $R_b$ are the same as defined in the above formula (3);
Structural Unit (D):
General Formula (8)
[Formula 8]

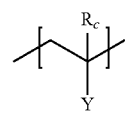

(8)

wherein, in the formula (8), $R_c$ represents a hydrogen atom or a methyl group, and Y represents a sulfophenyl group, a sulfo group, a carboxyl group, and an alkali metal salt or alkali earth metal salt thereof; and (E): General Formula (9)
[Formula 9]

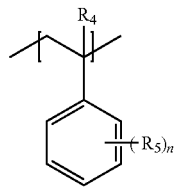

(9)

wherein, in the formula (9), $R_4$ represents hydrogen or a methyl group, $R_5$ represents a halogen atom, and n represents an integer of 0 to 5.

The present invention also relates to the novel polystyrene-based polyampholyte having UCST-type thermoresponsiveness described above, the polyampholyte having a number average molecular weight of 500 to 100,000 daltons (Da) as measured by gel permeation chromatography.

The present invention also relates to use of the novel polystyrene-based polyampholyte having UCST-type thermoresponsiveness described above as a draw solution for forward osmosis membrane method water treatment systems.

Advantageous Effects of the Invention

Polystyrene-based polyampholytes of the present invention, including at least one cationic monomer component selected from the group consisting of halogenated 4-vinylbenzyltrialkylammonium, vinylpyridine, and quaternized vinylpyridine and 4-vinylbenzenesulfonate as main components, are novel upper critical solution temperature (UCST)-type thermoresponsive polymers.

As their application, use in the biomedical field is anticipated. Additionally, such a polyampholyte, because of containing no hydrolyzable portion, is extremely useful as a draw solution for forward osmosis membrane method water treatment systems, from which durability is required. The polyampholyte of the present invention is an UCST-type polyampholyte and thus is useful, for example, in desalination treatment of seawater, petroleum produced water, and industrial effluents at 50° C. or more and food concentration, among forward osmosis membrane method water treatments.

BRIEF DESCRIPTION OF THE DRAWINGS

FIG. 6A shows the results of the temperature dependency of the hydrodynamic radius ($R_h$, symbol in the figure: ○) and the scattered light intensity (SI, symbol in the figure: Δ) of an aqueous solution of the copolymer obtained in Example 1, measured at a polymer concentration of 0.2 g/L and a salt concentration of 0.1 M.

FIG. 6B shows the results of the temperature dependency of the hydrodynamic radius ($R_h$, symbol in the figure: ○) and the scattered light intensity (SI, symbol in the figure: Δ) of an aqueous solution of the copolymer obtained in Example 2, measured at a polymer concentration of 0.2 g/L and a salt concentration of 1.0 M.

FIG. 7 shows the phase equilibrium of a polymer aqueous solution prepared in Example 17. The horizontal axis represents the polymer concentration (wt %), and the vertical axis represents the temperature (° C.). The upper part of the curve shown in the figure is a homogeneous phase, and the lower part thereof is a region where the solution is separated into two phases (the polymer becomes insoluble).

MODE FOR CARRYING OUT THE INVENTION

Figure 1:
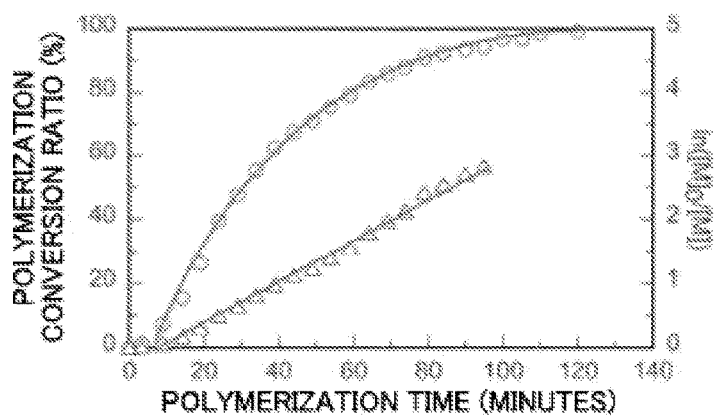
FIG. 1 shows the relationships of the polymerization time (horizontal axis, unit: minutes) with the polymerization conversion ratio (symbol in the figure: ○, left vertical axis, unit: %) and with the primary plot (symbol in the figure: Δ, right vertical axis, ln: natural logarithm) in Polymerization Example 1. $[M]_0$ represents the initial molar concentration of total monomers before polymerization is started, and $[M]$ represents the molar concentration of the total monomers at a certain time after the reaction is started.

Hereinafter, a mode for carrying out the present invention (hereinafter, referred to as "the present embodiment") will be described in detail. The present invention is not limited to the following present embodiment. The present invention can be conducted by properly modifying the same within the scope of the gist of the invention.

Halogenated 4-vinylbenzyltrialkylammonium, vinylpyridine, and quaternized vinylpyridine to be used for the present invention are cationic monomers that are included in the polyampholyte of the present invention and necessary for forming the structural unit (A) represented by the general formulas (1) to (3) or the structural unit (C) represented by the general formulas (5) to (7) described above.

Examples of the halogenated 4-vinylbenzyltrialkylammonium, vinylpyridine, and quaternized vinylpyridine to be used in the present invention include, but are not particularly limited to, 4-vinylbenzyltrimethylammonium chloride, 4-vinylbenzyltrimethylammonium bromide, 4-vinylbenzyltrimethylammonium iodide, 4-vinylbenzyltriethylammonium chloride, 4-vinylbenzyltripropylammonium chloride, 4-vinylbenzyltributylammonium chloride, and 4-vinylbenzyltrihexylammonium chloride. Further examples thereof include 4-vinylpyridine, 2-vinylpyridine, salts composed of such a vinylpyridine and an acid such as hydrochloric acid, hydrogen bromide, sulfuric acid, nitric acid, sulfonic acid, or carboxylic acid, quaternized vinylpyridines obtained by a reaction between such a vinylpyridine and a halogenated alkyl such as methyl chloride, methyl bromide, methyl iodide, ethyl chloride, ethyl bromide, or ethyl iodide, or quaternized vinylpyridines obtained by a reaction between such a vinylpyridine and a dialkyl sulfate such as dimethyl sulfate or diethyl sulfate.

The vinylbenzyltrialkylammonium described above is not limited to a para form and may be a mixture with a meta form or ortho form.

From the viewpoint of availability, 4-vinylbenzyltrimethylammonium chloride, 4-vinylbenzyltrimethylammonium bromide, 4-vinylbenzyltriethylammonium chloride, 4-vinylbenzyltriethylammonium bromide, 4-vinylpyridine, and 2-vinylpyridine are particularly preferable.

4-vinylbenzenesulfonates (also referred to as 4-styrenesulfonates) to be used in the present invention are anionic monomers that are included in the polyampholytes of the present invention and necessary for forming the structural unit (B) represented by the general formula (4) described above. Examples thereof include, but are not particularly limited to, sodium styrenesulfonate, potassium styrenesulfonate, ammonium styrenesulfonate, lithium styrenesulfonate, calcium styrenesulfonate, magnesium styrenesulfonate, barium styrenesulfonate, and styrenesulfonic acid.

From the viewpoint of availability and osmotic pressure, among these, sodium styrenesulfonate or lithium styrenesulfonate are particularly preferable, and sodium styrenesulfonate, which is highly versatile and inexpensive, is further preferable. However, lithium, which has a small ionic radius and will be strongly hydrated, has a lower degree of ionic concentration (against polystyrenesulfonate) than that of sodium. Thus, lithium is preferable when a higher osmotic pressure is required.

The styrenesulfonate described above is usually in a para form but may include an isomer such as a meta form or ortho form without any problem. Examples of the anionic monomer necessary for forming the structural unit (D) represented by the general formula (8) described above include nonaromatic anionic monomers such as methacrylic acid, methacrylates, acrylic acid, acrylates, vinylbenzoic acid, vinylbenzoates, vinylphosphonic acid, vinylphosphonates, vinylsulfonic acid, vinylsulfonates, and maleates, and the styrenesulfonates described above.

The styrene-based monomer to be used in the present invention is a nonionic monomer for forming the structural unit (E) represented by the general formula (9) described above included in the polyampholyte of the present invention. Examples thereof include, but are not particularly limited to, styrene, α-methylstyrene, chlorostyrene, dichlorostyrene, trichlorostyrene, bromostyrene, dibromostyrene, tribromostyrene, chloromethylstyrene, cyanostyrene, aminostyrene, fluorostyrene, trifluorostyrene, and methoxystyrene. From the viewpoint of availability, styrene and α-methylstyrene are preferable.

The UCST behavior exhibited by the polyampholyte of the present invention is considered to be caused mainly by a strong electrostatic interaction between cationic groups and anionic groups in the polymer. For this reason, in the polymer including the structural units (A) and (B) described above, the molar ratio between the cationic monomer unit (A) and the anionic monomer unit (B) is extremely important. The content of the structural unit (A) is preferably 36 to 64 mol %, more preferably 45 to 55 mol % for improving the sensitivity of thermoresponsiveness, with respect to the total of the structural units (A) and (B).

The polyampholyte of the present invention is based on polystyrene, and a non-electrostatic interaction derived from the aromatic ring is considered to also contribute to development of the UCST behavior. In other words, the polyampholyte of the present invention is considered to aggregate (be insolubilized) in water and solubilized on heating (UCST behavior) due to the two electrostatic and non-electrostatic interactions.

Thus, as the molecular weight increases, the dissolution or aggregation temperature (UCST transition temperature) is considered to rise. Accordingly, for example, when the UCST transition temperature is required to decrease in a high molecular weight component, it is only required to weaken the interaction due to the aromatic ring by increasing one of the cationic group or anionic group or using the nonaromatic anionic monomer described above in combination.

On the other hand, when the UCST transition temperature is required to increase in a low molecular weight component, it is only required to enhance the non-electrostatic interaction, for example, by introducing the structural unit (E) as a third component to the polymer including the structural units (C) and (D) described above.

Here, the content of the structural unit (E) is preferably 1 to 50 mol % with respect to the total of the structural units (C), (D), and (E). However, the transition temperature may excessively increase or the osmotic pressure may decrease depending on applications, and thus, the content of the structural unit (E) is preferably 1 to 30 mol %.

As long as the content of the structural unit (C) is 36 to 64 mol % with respect to the total of the structural units (C) and (D) and the UCST property, durability, osmotic pressure of the polyampholyte are not compromised, a structural unit (F) may be introduced in addition to the structural unit (E).

The monomer forming the structural unit (F) is not particularly limited as long as the monomer copolymerizes with the monomers forming (C), (D), and (E) described above, and examples thereof include acrylonitrile, vinyl chloride, N-substituted maleimide, (anhydrous) maleic acid, maleic acid esters, fumaric acid esters, acrylamide, methacrylamide, vinylpyrrolidone, vinylphenyl methanesulfonic acid, vinylphenyl methanephosphonic acid, styrene phosphonic acid, and vinylpyridine.

The electrostatic and non-electrostatic interactions between the polyampholytes described above depend on the type of cationic monomer. Use of vinylbenzyltrialkylammonium having higher basicity and aromaticity basically enhances the interactions, and use of vinylpyridine (salt) having lower basicity and aromaticity basically weakens the interactions. However, these interactions are affected by the substituent on the nitrogen atom or the type of counter anion, and thus, fine adjustment is required in accordance with the purpose.

There are known some exemplary studies on a sodium styrenesulfonate-vinylbenzyltrimethylammonium chloride copolymer (e.g., Y. Takeoka et al., Physical Review Letters, Vol. 82, No. 24, 4863-4865, 1999; Y. K. Bhardwaj et al., Journal of Applied Polymer Science, Vol. 88, 730-742, 2003).

However, in any of these documents, N,N'-methylenebisacrylamide is copolymerized as a crosslinkable monomer, and the products are limited to gels chemically crosslinked (by covalent bonding). The latter document describes also a system including no N,N'-methylenebisacrylamide, which is obtained via polymerization using gamma rays, and the product is still a gel chemically crosslinked (via covalent bonding). The product is a gel or at least a branched polymer, and it is thus difficult for the product to self-organize in a more structure-controlled manner, for example. When such a polymer is supposed to be a draw agent in a forward osmosis water treatment system including a hollow fiber membrane, for example, it is difficult to cause the agent in the gel form to flow through a narrow flow path.

Meanwhile, the polyampholyte of the present invention is a sol including no chemically crosslinked structure, and is a polymer of which the molecular weight can be measured by gel permeation chromatography, as described in Examples below, and of which the hydrodynamic radius determined by dynamic light scattering is a few nanometers. In other words, it is possible to cause a conventional gel or branched polymer to self-organize in a more structure-controlled manner.

Additionally, there is an exemplary report on a sodium styrenesulfonate-4-vinylpyridinium copolymer (e.g., J. C. Salamone et al., Journal of Macromolecular Science-Chemistry, A13 (5), 665-672, 1979). It is mentioned that the resulting copolymer is insoluble in the pH range of 0 to 6 and water-soluble in the pH region outside the range. However, the molecular weight, concentration, and solution physical properties of the copolymer are not described at all.

A method for producing a novel polystyrene-based polyampholyte having upper critical solution (hereinafter, abbreviated as UCST)-type thermoresponsiveness of the present embodiment is not particularly limited.

Examples of the production method include a batch polymerization method in which, for example, a monomer solution prepared by dissolving a cationic monomer such as halogenated 4-vinylbenzyltrialkylammonium, vinylpyridine, vinylpyridine salt, or quaternized vinylpyridine, an anionic monomer such as styrenesulfonate, and, as necessary, a nonionic styrene-based monomer, a polymerization initiator, and a chain transfer agent (also referred to as a molecular weight regulator) are placed in a batch manner in a reactor and polymerized, and a sequential addition method in which polymerization is conducted while a mixed solution of the monomers described above and a chain transfer agent, and a polymerization initiator supplied to the reactor. Among these, the sequential addition method is preferably used in respect of its excellent removability of polymerization heat.

Also as the polymerization method, in addition to common radical polymerization, a living radical polymerization method by which advanced molecular weight control or block copolymerization is enabled is applicable.

As another production method, after halomethylstyrene such as chloromethylstyrene or vinylpyridine is copolymerized with styrenesulfonate, styrenesulfonic acid ester, or chlorosulfonyl styrene, a halomethyl group can be reacted with a tertiary amine such as trimethylamine, triethylamine, tributylamine, or pyridine to provide a quaternary ammonium, a pyridine residue can be reacted with a halogenated alkyl to provide a quaternary ammonium, or a sulfonic acid ester or chlorosulfonyl group can be hydrolyzed to regenerate sulfonic acid. In respect of productivity, preferable is a method of copolymerizing halogenated 4-vinylbenzyltrialkylammonium or vinylpyridine salt, which is water-soluble, with styrenesulfonate.

The solvent is not particularly limited as long as the solvent can homogeneously dissolve the monomer mixture described above, and examples thereof include water, alcohols such as methanol, ethanol, isopropanol, and ethylene glycol, cellosolves such as methoxy ethanol and ethoxy ethanol, acetonitrile, acetone, tetrahydrofuran, dioxane, N-methylpyrrolidone, dimethylformamide, dimethylsulfoxide, and dimethylacetamide, and additionally mixed solvents thereof.

In order to improve the solubility of the monomer mixture described above, an inorganic salt such as sodium chloride, sodium bromide, potassium chloride, or potassium bromide may be added in the aqueous solvent. In order to prevent precipitation of the monomer mixture, each of the monomers may be separately supplied in the reactor. The monomer concentration is preferably as high as possible in order to enhance the polymerization rate and conversion ratio, but in consideration that the solubility is also achieved, the monomer concentration is preferably 5 wt % to 30 wt %.

Examples of the radical polymerization initiator described above include peroxide compounds such as di-t-butyl peroxide, dicumyl peroxide, t-butylcumyl peroxide, benzoyl peroxide, dilauryl peroxide, cumen hydroperoxide, t-butyl hydroperoxide, 1,1-bis(t-butylperoxy)-3,5,5-trimethylcyclohexane, 1,1-bis(t-butylperoxy)-cyclohexane, cyclohexanone peroxide, t-butylperoxy benzoate, t-butylperoxy isobutyrate, t-butylperoxy-3,5,5-trimethylhexanoate, t-butylperoxy-2-ethylhexanoate, t-butylperoxyisopropyl carbonate, cumylperoxy octoate, potassium persulfate, ammonium persulfate, and hydrogen peroxide, and azo compounds such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutyronitrile), 1,1'-azobis(cyclohexane-1-carbonitrile), 1-[(1-cyano-1-methylethyl)azo]formamide, dimethyl 2,2'-azobis(2-methylpropionate), 4,4'-azobis(4-cyanovaleric acid), 2,2'-azobis(2,4,4-trimethylpentane), 2,2'-azobis{2-methyl-N-[1,1'-bis(hydroxymethyl)-2-hydroxyethyl]propionamide}, 2,2'-azobis{2-(2-imidazolin-2-yl)propane]dihydrochloride, 2,2'-azobis{2-(2-imidazolin-2-yl)propane]disulfate dihydrate, 2,2'-azobis{2-[1-(2-hydroxyethyl)-2-imidazolin-2-yl)propane]}dihydrochloride, 2,2'-azobis(1-imino-1-pyrrolidino-2-methylpropane)dihydrochloride, 2,2'-azobis(2-methylpropionamidine)dihydrochloride, 2,2'-azobis[N-(2-carboxyethyl)-2-methylpropionamidine]tetrahydrate, 1,1'-azobis(1-acetoxy-1-phenylmethane), and 4,4'-diazendiylbis(4-cyanopentanoic acid)-α-hydro-ω-hydroxypoly(oxyethylene) polycondensate.

Among these, from the viewpoints of solubility and molecular weight controllability in living radical polymerization described below, preferable are water-soluble azo initiators such as 2,2'-azobis{2-methyl-N-[1,1'-bis(hydroxymethyl)-2-hydroxyethyl]propionamide}, 2,2'-azobis{2-(2-imidazolin-2-yl)propane]dihydrochloride, 2,2'-azobis{2-(2-imidazolin-2-yl)propane]disulfate dihydrate, 2,2'-azobis{2-[1-(2-hydroxyethyl)-2-imidazolin-2-yl)propane]}dihydrochloride, 2,2'-azobis(2-methylpropionamidine)dihydrochloride, and 2,2'-azobis[N-(2-carboxyethyl)-2-methylpropionamidine]tetrahydrate.

When the peroxide polymerization initiator as described above is used from the viewpoint of economic efficiency, a reducing agent such as ascorbic acid, erythorbic acid, aniline, a tertiary amine, rongalit, hydrosulfite, sodium sulfite, sodium bisulfite, sodium thiosulfate, or sodium hypophosphite may be used in combination, as necessary.

The amount of the radical polymerization initiator used is usually 0.01 to 10 mol %, and in consideration of the purity of the intended product, more preferably 0.01 to 5 mol %, with respect to the total monomers.

Examples of the molecular weight regulator (chain transfer agent) include, but are not particularly limited to, mercaptans such as thioglycolic acid, thiomalic acid, 2-mercaptopropionic acid, 3-mercaptopropionic acid, thiosalicylic acid, 3-mercaptobenzoic acid, 4-mercaptobenzoic acid, thiomalonic acid, dithiosuccinic acid, thiomaleic acid, thiomaleic anhydride, dithiomaleic acid, thioglutaric acid, cysteine, homocysteine, 5-mercaptotetrazole acetic acid, 3-mercapto-1-propanesulfonic acid, 3-mercaptopropane-1,2-diol, mercaptoethanol, 1,2-dimethylmercaptoethane, 2-mercaptoethylamine chloride, 6-mercapto-1-hexanol, 2-mercapto-1-imidazole, 3-mercapto-1,2,4-triazol, cysteine, N-acylcysteine, glutathione, N-butylaminoethanethiol, and N,N-diethylaminoethanethiol; disulfides such as diisopropyl xanthogen disulfide, diethyl xanthogen disulfide, diethyl thiuram disulfide, 2,2'-dithiodipropionic acid, 3,3'-dithiodipropionic acid, 4,4'-dithiodibutanoic acid, and 2,2'-dithiobisbenzoic acid; halogenated hydrocarbons such as iodoform; thiocarbonylthio compounds such as benzyl dithiobenzoate, 2-cyanoprop-2-yl dithiobenzoate, 4-cyano-4-(thiobenzoylthio)pentanoic acid, 4-cyano-4-(dodecylsulfanylthiocarbonyl)sulfanylpentanoic acid, S,S-dibenzyl trithiocarbonate, 3-((((1-carboxyethyl)thio)carbonothioyl)thio)propanoic acid, and cyanomethyl(3,5-dimethyl-1H-pyrazole)carbodithioate; alkyl iodide compounds such as α-iodobenzyl cyanide, 1-iodoethylbenzene, ethyl 2-iodo-2-phenyl acetate, 2-iodo-2-phenylacetic acid, 2-iodopropanoic acid, and 2-iodoacetic acid; diphenylethylene, p-chlorodiphenylethylene, p-cyanodiphenylethylene, α-methylstyrene dimers, organotellurium compounds, and sulfur. Living radical polymerization employing a thiocarbonylthio compound or alkyl iodide compound, among these, is preferable in respect of molecular weight controllability.

As a method of polymerizing a monomer while the monomer is sequentially added to a reactor, for example, a reactor equipped with a stirrer, a condenser tube, and a nitrogen introducing tube is charged with a portion of a monomer mixture containing an aqueous solvent and/or a molecular weight regulator, sufficient deoxygenation is conducted by a process such as pressure reduction-introduction of an inert gas, and the temperature is raised to a predetermined temperature. Then, polymerization is conducted while the remaining monomer mixture containing a molecular weight regulator and a radical polymerization initiator are sequentially added, and thereby the polyampholyte of the present invention can be provided.

The polymerization temperature is, as in normal radical polymerization, 10 to 100° C., more preferably 40 to 90° C., further preferably 60 to 90° C. from the viewpoint of the polymerization conversion ratio.

The polymerization time is preferably 2 hours to 30 hours, further preferably 2 hours to 10 hours. In the case of polymerization by a sequential addition method, the period during which the monomer mixture containing a molecular weight regulator and the polymerization initiator are continuously added usually ranges 1 hour to 4 hours.

In the case of the living radical polymerization method described above, polymerization proceeds while radicals are reversibly generated from a dormant species, and runaway reaction is unlikely to occur. Thus, total batch addition polymerization may be more preferable than the sequential addition polymerization method in respect of the polymerization conversion ratio and molecular weight controllability.

As described above, in the present invention, the molar ratio between the cationic monomer unit (A) and the anionic monomer unit (B) contained in the polyampholyte is the most important factor that affects the thermoresponsiveness, and the molecular weight of the polymer is an important factor that affects the transition temperature and the phase separability and osmotic pressure on cooling the polymer aqueous solution.

In other words, the polystyrene-based polyampholyte of the present invention preferably has a number average molecular weight of 500 to 100,000 daltons (Da) as measured by gel permeation chromatography (GPC). When the number average molecular weight is 500 daltons or less, the polymer may be dissolved in water even at low temperatures. In contrast, when the number average molecular weight exceeds 100,000 daltons, the polymer may not be dissolved in water even when the polymer is heated or salt is added thereto. In further consideration of thermoresponsiveness, the number average molecular weight is more preferably 1,000 to 50,000 daltons.

The narrower the molecular weight distribution, the more excellent the thermoresponsiveness or phase separability. Thus, the value obtained by dividing the weight average molecular weight by the number average molecular weight is preferably as small as possible. A value in the range of 1.00 to 3.00 has no problem, but a value of 1.00 to 2.00 is more preferable. For biomedical applications, in which a high purity is particularly required, a value of 1.00 to 1.50 is further preferable. The molecular weight distribution can be narrowed by a technique such as the living radical polymerization method described above, but after polymerization is conducted by a common radical polymerization method, the molecular weight distribution can be narrowed by a method such as fractional precipitation, dialysis, or microfiltration. The polymer of the present invention is phase-separated from the aqueous solution by cooling. Thus, when dissolution by heating and separation by cooling of the polymer are repeated, a component having a smaller molecular weight and a lower phase separation temperature can be removed, and a law molecular salt composed of at least two types of counter ions contained in the polymer also can be removed.

EXAMPLES

The present invention will be described more concretely with reference to the following Examples, but the present invention is not limited in any way by these Examples.

1. Measurement of Polymerization Conversion Ratio and Identification of Polymer (1) Proton Nuclear Magnetic Resonance Spectrum Measurement The NMR spectrum of a reaction solution was measured using DRX-500 manufactured by Bruker BioSpin K.K., and the polymerization conversion ratio was calculated from the ratio of decrease in the integrated intensity derived from a vinyl group measured at a chemical shift of 5.7 ppm. Additionally, the copolymer after purification was dissolved in deuterium oxide containing 1.2 M salt, and subjected to proton NMR measurement as well.

(2) Total Reflection Infrared Absorption Spectrum Measurement

A copolymer sample in the powder form was pressed onto a light focusing prism made of zinc selenide and measured using FT/IR-4200 manufactured by JASCO Corporation. Note that the measurement was conducted at an incident angle of 450 for 256 times of integration. Spectra Manager Ver.2 software manufactured by JASCO Corporation was used for data analysis.

(3) Gel Permeation Chromatography (GPC) Measurement

The copolymer was dissolved in the following eluant to prepare a 0.1 wt % solution, which was subjected to GPC measurement using HLC-8320 manufactured by TOSOH CORPORATION under the following conditions. The polymer conversion ratio was calculated from the peak area (a) derived from the monomer and the peak area (b) derived from the polymer by the following equation.

Polymer conversion ratio (area %)=100×[1−{$a/(a+b)$}]

Columns: TSK guardcolumn AW-H/TSK AW-6000/TSK AW-3000/TSK AW-2500

Eluant: sodium sulfate aqueous solution (0.05 mol/L)/acetonitrile=65/35 (volume ratio) solution Flow rate, amount injected, and column temperature: 0.6 ml/min, amount injected: 10 µl, column temperature: 40° C.

Detector: UV detector (wavelength: 230 nm) or RI detector

Calibration curve: The calibration curve was created using standard sodium polystyrenesulfonate (manufactured by Sowa Science Corporation) and standard polyethylene glycol (Mp 400 to 40,000, manufactured by Aldrich-Aldrich Japan) from peak top molecular weights and dissolution times.

2. Observation of UCST Behavior of Polymer Aqueous Solution (1) Measurement of Light Transmittance A sample solution was placed in a quartz cell having an optical path length of 10 mm, and the transmittance of light at 700 nm (% T) was measured. % T was measured by V-630 Bio manufactured by JASCO Corporation, equipped with a temperature control system (ETC-717 manufactured by JASCO Corporation). The measurement was conducted at a heating and cooling rate of 1.0° C./min during a temperature rise from 20 to 80° C. and a temperature decrease from 80 to 20° C.

(2) Dynamic Light Scattering (DLS) Measurement

After the sample solution was filtered through a 0.2-µm membrane filter, the change in the scattered light intensity at a scattering angle of 173 degrees over time was investigated using Zetasizer Nano ZS manufactured by Malvern Panalytical Ltd., equipped with helium neon laser (632.8 nm, 4 mW). The resulting data were analyzed with Zetasizer 7.11 software manufactured by Malvern Panalytical Ltd. to determine the hydrodynamic radius (Rh) and polydispersity index (PDI). The values of Rh and scattered light intensity (SI) each are the average value of two measurement values.

(3) Measurement of Zeta Potential

The zeta potential is measured with the sample and apparatus used in (2) Dynamic light scattering measurement described above and analyzed with Zetasizer 7.11 software manufactured by Malvern Panalytical Ltd.

(4) Phase Contrast Microscope Observation

A sample solution having a polymer concentration of 2.0 g/L and a salt concentration of 0.1 M was dropped onto a prepared slide and observed as it was at 20° C. As the microscope, an All-in-One Fluorescence Microscope BZ-8000 manufactured by KEYENCE CORPORATION (objective lens: CFI Plan Apo 10× manufactured by Nikon Corporation) is used.

(5) Fluorescence Spectrum Measurement

A saturated aqueous solution of N-phenyl-1-naphthylamine (PNA) is used to prepare a sample solution so as to achieve intended polymer and salt concentrations. The sample solution is subjected to fluorescence spectrum measurement using a fluorescence spectrophotometer F-2500 manufactured by Hitachi High-Technologies Corporation. The excitation is at 330 nm, and the measurement is conducted with slit widths of 20 nm and 5 nm on the excitation and emission sides, respectively. Note that a cell holder fitted with a circulation-type constant temperature bath (NCB-1200 manufactured by Tokyo Rikakikai Co., Ltd.) is used to control the temperature.

3. Measurement of Osmotic Pressure of Polymer Aqueous Solution

The water activity value of the polymer aqueous solution was converted to an osmotic pressure (bar) using the following conversion equation [see Divina D.; Separation and Purification Technology 138 (2014) 92-97].

[Expression 1]

$$\text{Osmotic pressure (bar)} = \frac{-0.082 \times [273.15 + \text{measurement temperature (° C.)}] \times 1013 \times \ln(\text{water activity value})}{18.018}$$

The water activity was measured at 50° C. using a water activity measurement apparatus (AquaLab Series 4TDL manufactured by AINEX Co., Ltd.). The measurement was conducted 3 times, and the average value was used for calculation of the osmotic pressure. Note that the measurement was conducted with the water activity apparatus placed in a constant temperature bath at 50° C. in order to prevent measurement errors.

<Reagents Used>

As the compounds described in Examples, the following compounds were used, but the present invention is not limited in any way by these Examples.

NaSS: sodium p-styrenesulfonate (purity: 98%, manufactured by Tokyo Chemical Industry Co., Ltd.)

LiSS: lithium p-styrenesulfonate (purity: 86%, manufactured by Tosoh Finechem Corporation)

VBTAC: vinylbenzyltrimethylammonium chloride (purity: 99%, manufactured by Sigma-Aldrich)

4VP: 4-vinylpyridine (purity: 96%, manufactured by FUJIFILM Wako Pure Chemical Corporation)

2VP: 2-vinylpyridine (purity: 97%, manufactured by FUJIFILM Wako Pure Chemical Corporation)

MAA: methacrylic acid (purity: 99%, manufactured by FUJIFILM Wako Pure Chemical Corporation)

St: styrene (purity: 99%, manufactured by FUJIFILM Wako Pure Chemical Corporation)

αMSt: α-methylstyrene (purity: 99%, manufactured by Tokyo Chemical Industry Co., Ltd.)

PNA: N,N-phenyl-1-naphthylamine (purity: 98%, manufactured by Tokyo Chemical Industry Co., Ltd.)

V-501: 4,4'-azobis-(4-cyanopentanoic acid) (purity: 98%, manufactured by FUJIFILM Wako Pure Chemical Corporation)

V-50: 2,2'-azobis(2-methylpropionamidine) dihydrochloride (purity: 97%, manufactured by FUJIFILM Wako Pure Chemical Corporation)

TGL: 3-mercapto-1,2-propanediol (purity: 97%, manufactured by FUJIFILM Wako Pure Chemical Corporation)

P-NaSS: sodium polystyrenesulfonate (molecular weight: 70,000, manufactured by Sigma-Aldrich)

CPD: 4-cyanopentanoic acid dithiobenzoate (synthesized in accordance with a known method (Y. Mitsukami et al, Macromolecules, 2001, 34, pages 2248 to 2256))

Polymerization Example 1

Applicability of a RAFT (reversible addition fragmentation chain transfer) polymerization method, which is one of living radical polymerization methods, was confirmed.

VBTAC (212 mg, 1.00 mmol), NaSS (206 mg, 1.00 mmol), a RAFT agent CPD (5.61 mg, 0.20 mmol), and an initiator V-501 (2.86 mg, 0.10 mmol) were dissolved in deuterium oxide containing 1.2 M NaCl (1.8 mL) and methanol (0.2 mL) (molar ratio: [VBTAC]/[NaSS]/[CPD]/[V-501]=50/50/10/5).

The solution was transferred in a NMR tube and deoxygenated by argon bubbling. Then, polymerization was conducted in a NMR apparatus with the temperature maintained at 70° C. The NMR spectrum of the reaction system was measured at appropriate time intervals, and the polymerization conversion ratio was calculated from the ratio of decrease in the integrated intensity derived from a vinyl group measured at a chemical shift of 5.7 ppm.

The peaks of the vinyl groups of VBTAC and NaSS overlapped with each other, and thus, the polymerization conversion ratio of the total monomers of VBTAC and NaSS was estimated. As shown in FIG. 1, after an induction period of 4.5 minutes, the polymerization conversion ratio increased with the polymerization time. Since the primary plot linearly increased in the period from 4.5 minutes to 100 minutes, it was found that this polymerization followed the first-order reaction mechanism. In other words, it was confirmed that the propagating radical concentration during the polymerization reaction was constant and that the polymerization was livingly proceeding.

In the case of living polymerization in which the RAFT agent was used, the theoretical degree of polymerization and theoretical number average molecular weight can be calculated by the following calculation equations.

$$\text{Theoretical degree of polymerization} = (\text{initial concentration of monomers})/(\text{initial concentration of RAFT agent}) \times (\text{polymerization conversion ratio}/100)$$

$$\text{Theoretical number average molecular weight} = \text{theoretical degree of polymerization} \times \text{molecular weight of monomers} + \text{molecular weight of RAFT agent}$$

Example 1

<Synthesis of NaSS/VBTAC Copolymer by RAFT Polymerization Method>

It was confirmed, from Polymerization Example 1, that living radical copolymerization of NaSS and VBTAC by use of a RAFT agent was enabled. Then, a NaSS/VBTAC copolymer having a total theoretical degree of polymerization of 20 was synthesized by this method.

That is, VBTAC (530 mg, 2.51 mmol), NaSS (546 mg, 2.65 mmol), a RAFT agent CPD (69.8 mg, 0.250 mmol), an initiator V-501 (35.0 mg, 0.125 mmol), an aqueous solution containing 1.2 M NaCl (4.50 mL), and methanol (0.502 mL) were placed in a 25 ml eggplant flask fitted with a two-way cock and dissolved to prepare a homogeneous solution (molar ratio: [VBTAC]/[NaSS]/[CPD]/[V-501]=10/10/1/0.5).

After the solution was deoxygenated by a freeze-degassing method, polymerization was conducted under an argon atmosphere with heating at 70° C. for 5 hours. After the polymerization was finished, as a result of proton NMR measurement of the polymerization solution, the polymerization conversion ratio was found to be 99.2% from a decrease in the vinyl group.

The polymerization solution as the reaction mixture was dialyzed against an aqueous solution of 1.2 M NaCl for 2 days and then against water for 1 day, using a cellulose tube dialysis membrane 36/32 (manufactured by Sekisui Medical Co., Ltd.). Thereafter, a polymer (689 mg, 64.0%) was collected by lyophilization. The polymer P(VBTAC/NaSS)$_{20}$ has a theoretical number average molecular weight of $4.18 \times 10^3$ g/mol.

<Identification of Polymer: Total Reflection Infrared Absorption Spectrum Measurement>

Figure 2A:
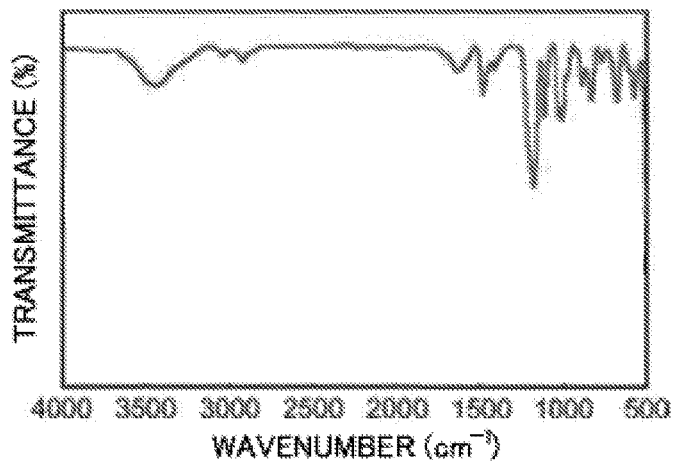
FIG. 2A shows the total reflection infrared absorption spectrum of the copolymer obtained in Example 1 (vertical axis: transmittance, %, horizontal axis: wavenumber, cm$^{-1}$).

Characteristic peaks observed at 3033 cm$^{-1}$ and 2923 cm$^{-1}$ were derived from aromatic C—H stretching and aliphatic C—H stretching, respectively. Peaks observed at 1623 cm$^{-1}$ and 1482 cm$^{-1}$ indicate the stretching vibration of the aromatic carbon-carbon double bond and the stretching vibration of the alkyl C—H, respectively. A peak derived from the sulfonate group was observed at 1183 cm$^{-1}$. The polymer adsorbs the moisture in air due to the structure of the polymer, and thus, an O—H stretching reaction derived from water was observed at 3400 cm$^{-1}$ (FIG. 2A).

<Identification of Polymer: Proton NMR Measurement>

Figure 3A:
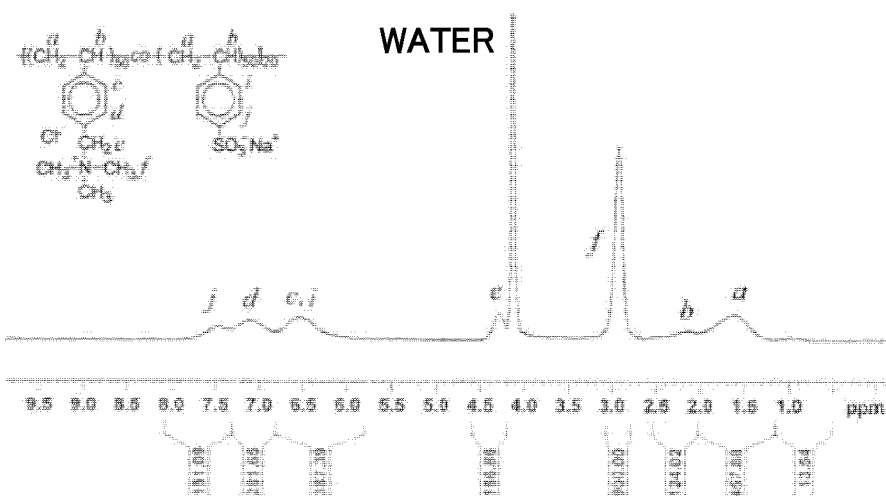
FIG. 3A shows the proton nuclear magnetic resonance spectrum of the copolymer obtained in Example 1 (horizontal axis: chemical shift, ppm).

The proton NMR spectrum measured at 80° C. in deuterium oxide containing 1.2 M salt is shown in FIG. 3A. Note that the measurement was conducted with the temperature raised to 80° C., which is higher than the UCST, in order to completely dissolve the polymer in the solvent. The proton signal from the main chain was observed at a chemical shift between 0.8 ppm and 2.3 ppm. From the integrated intensity ratio between the phenyl proton in the side chain observed at a chemical shift between 6.2 ppm and 7.8 ppm and the methylene proton in VBTAC side chain observed at a chemical shift of 2.9 ppm, the VBTAC content in the polymer was found to be 48 mol %. That is, the molar ratios of VBTAC and of NaSS in the copolymer are considered to be substantially the same.

<Confirmation of UCST Behavior of Polymer: Measurement of Light Transmittance of Aqueous Solution>

First, in order to determine the salt concentration dependency of the phase transition temperature at a constant polymer concentration, that is, the phase transition temperature at a polymer concentration of 2.0 g/L and a salt concentration of 0 to 0.2 M, the relationship between the solution temperature and the light transmittance of the polymer aqueous solution was investigated. The polymer was not dissolved in water at normal temperature but was completely dissolved by heating, and the solution became transparent (i.e., the light transmittance was substantially 100%). Since the polymer became insoluble again on cooling, the polymer was confirmed to exhibit an UCST.

Figure 4A:
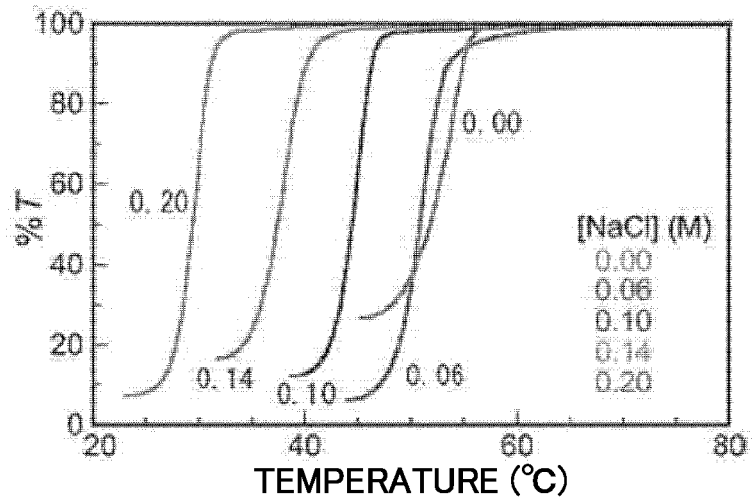
FIG. 4A shows the results of the temperature dependency of the transmittance of light at 700 nm (% T) through aqueous solutions of the copolymer obtained in Example 1, measured by changing the salt concentration. Here, the numerical values in the figure each represent the molar concentration of salt.
Figure 4B:
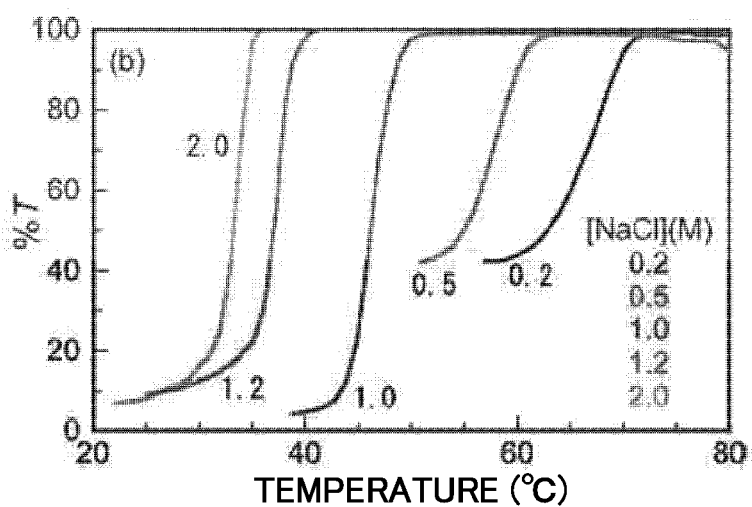
FIG. 4B shows the results of the temperature dependency of the transmittance of light at 700 nm (% T) through aqueous solutions of the copolymer obtained in Example 2, measured by changing the salt concentration. Here, the numerical values in the figure each represent the molar concentration of salt.
Figure 4C:
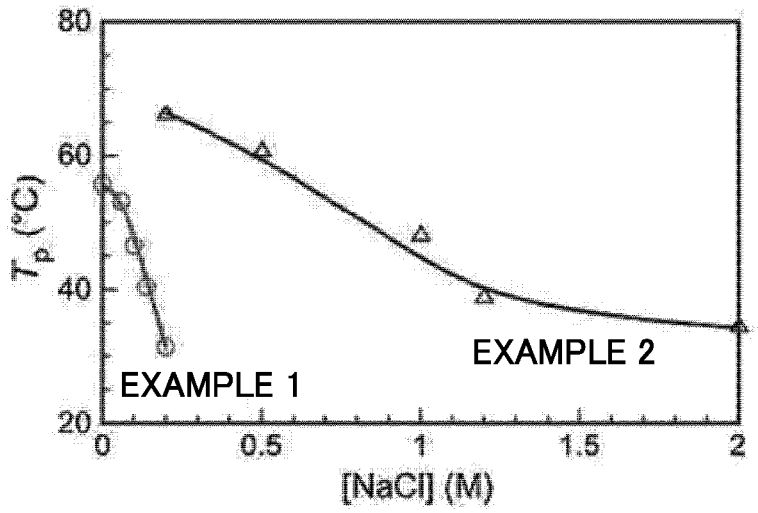
FIG. 4C is a plot of the phase transition temperature ($T_p$), determined from the inflection point of the curves in (a) and (b), against the salt concentrations. Here, the symbol ○ in the figure represents the result of the copolymer of Example 1, and the symbol Δ represents the result of the copolymer of Example 2. All the data in the figure are the results of measurement at a polymer concentration of 2.0 g/L.

The change in the light transmittance in the course of cooling is shown in FIG. 4A, from which it is obvious that the phase transition temperature can be easily controlled via the salt concentration.

Figure 5A:
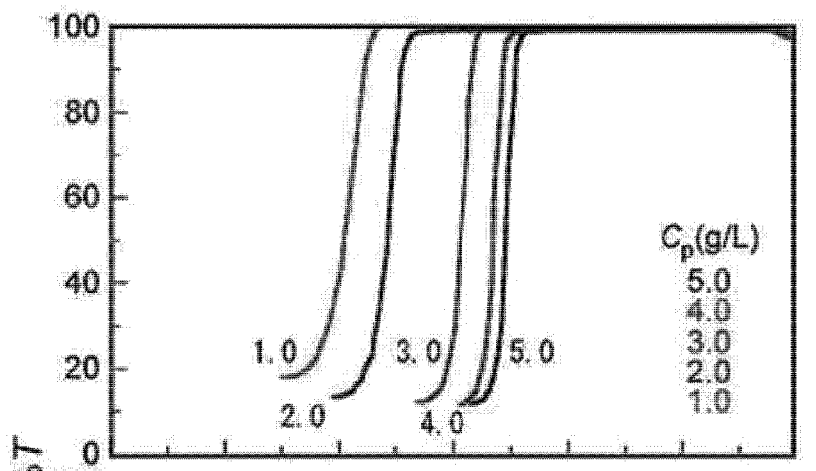
FIG. 5A shows the results of the temperature dependency of the transmittance of light at 700 nm (% T) through aqueous solutions of the copolymer obtained in Example 1, measured at a salt concentration of 0.1 M by changing the copolymer concentration. Here, the numerical values in the figure each represent the concentration of the polymer.

Next, in order to determine the polymer concentration dependency of the phase transition temperature at a constant salt concentration, that is, the phase transition temperature at a salt concentration of 0.1 M and a polymer concentration of 1.0 to 5.0 g/L, the relationship between the solution temperature and the light transmittance of the polymer aqueous solution was investigated. First, the change in the light transmittance in the course of cooling after the polymer aqueous solution was heated until became completely transparent (i.e., light transmittance was substantially 100%) is shown in FIG. 5A. It is obvious that the phase transition temperature can be easily controlled via the polymer concentration.

<Confirmation of UCST Behavior of Polymer: Dynamic Light Scattering Measurement>

A sample solution having a polymer concentration of 2.0 g/L and a salt concentration of 0.1 M was prepared, and the temperature dependency of the hydrodynamic radius (Rh) and scattered intensity (SI) in the course of cooling was investigated. As shown in FIG. 6A, in the vicinity of the phase transition, that is, at 50° C. or less, Rh and SI abruptly increased. This temperature well coincided with the transition temperature in the light transmittance measurement described above.

At the phase transition temperature or more, Rh was 2.5 nm and SI was 107 kcps, which were small and constant. Thus, it was suggested that the polymer was dissolved in a unimer state at the phase transition temperature or more.

Example 2

A NaSS/VBTAC copolymer having a total theoretical degree of polymerization of 97 was synthesize in the same manner as in Example 1. That is, VBTAC (529 mg, 2.50 mmol), NaSS (515 mg, 2.50 mmol), a RAFT agent CPD (13.9 mg, 0.05 mmol), an initiator V-501 (7.0 mg, 0.025 mmol), an aqueous solution containing 1.2 M NaCl (4.50 mL), and methanol (0.500 mL) were placed in a 25 mL eggplant flask fitted with a two-way cock and dissolved to prepare a homogeneous solution (molar ratio: [VBTAC]/[NaSS]/[CPD]/[V-501]=50/50/1/0.5). Hereinafter, the polymer was collected (720 mg, 68.0%) in the same manner as in Example 1. The polymer P(VBTAC/NaSS)$_{97}$ has a theoretical number average molecular weight of $2.03 \times 10^4$ g/mol.

<Total Reflection Infrared Absorption Spectrum Measurement of Polymer>

Figure 2B:
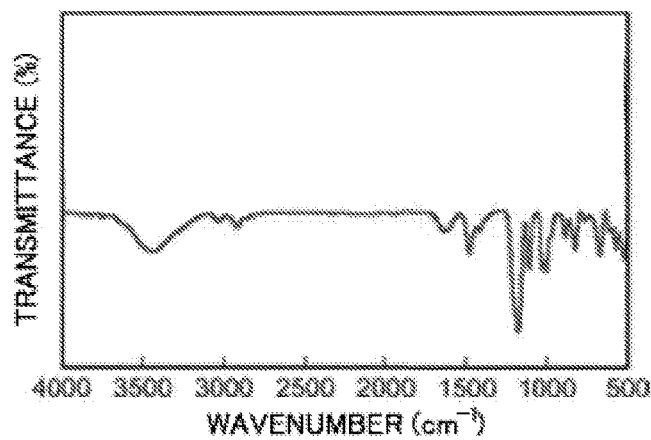
FIG. 2B shows the total reflection infrared absorption spectrum of the copolymer obtained in Example 2.

As shown in FIG. 2B, a spectrum same as that of P(VBTAC/NaSS)$_{20}$ of Example 1 was obtained.

<Proton NMR Measurement of Polymer>

Figure 3B:
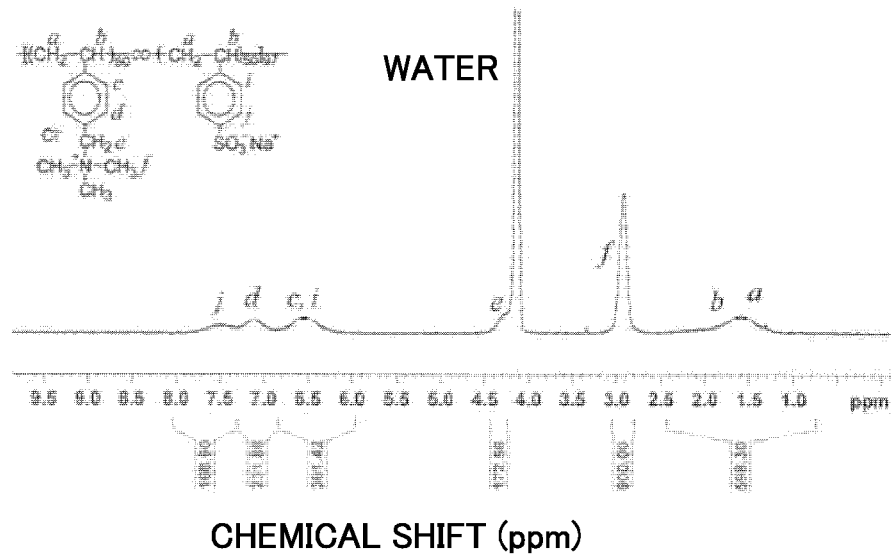
FIG. 3B shows the proton nuclear magnetic resonance spectrum of the copolymer obtained in Example 2.

The proton NMR spectrum measured at 80° C. in deuterium oxide containing 1.2 M salt is shown in FIG. 3B. As shown in FIG. 3B, a spectrum substantially same as that of P(VBTAC/NaSS)$_{20}$ of Example 1 was obtained. From the integrated intensity ratio, it was confirmed that the VBTAC content in the polymer was 52 mol % and the molar ratios of the VBTAC and NaSS in the copolymer were substantially equivalent.

<Confirmation of UCST Behavior of Polymer: Measurement of Light Transmittance of Aqueous Solution>

As in Example 1, the polymer was not dissolved in water at normal temperature but was completely dissolved by heating, and the solution became transparent (i.e., the light transmittance was substantially 100%). Since the polymer became insoluble again on cooling, the polymer was confirmed to exhibit an UCST property.

The relationship between the solution temperature and the light transmittance at a polymer concentration of 2.0 g/L and a salt concentration of 0.2 to 2.0 M was investigated in the same manner as in Example 1. The change in the light transmittance in the course of cooling is shown in FIG. 4A, from which it is obvious that the phase transition temperature can be easily controlled via the salt concentration, as in Example 1.

Figure 5B:
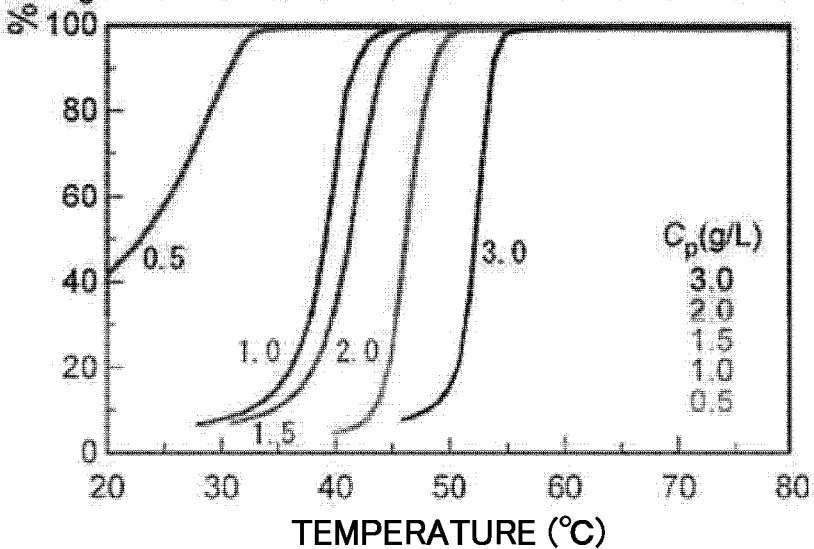
FIG. 5B shows the results of the temperature dependency of the transmittance of light at 700 nm (% T) through aqueous solutions of the copolymer obtained in Example 2, measured at a salt concentration of 1.0 M by changing the copolymer concentration. Here, the numerical values in the figure each represent the concentration of the polymer.
Figure 5C:
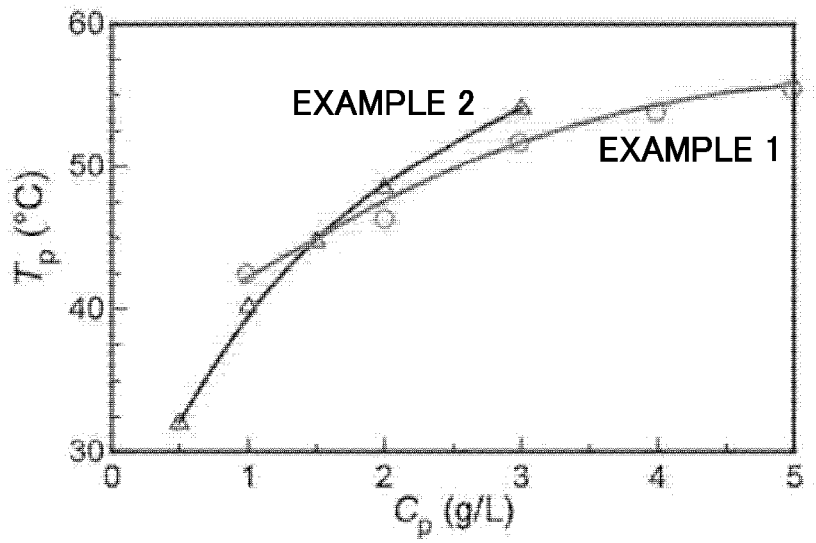
FIG. 5C is a plot of the phase transition temperature ($T_p$), determined from (a) and (b), against the copolymer concentrations. Here, the symbol ○ in the figure represents the result of the copolymer of Example 1, and the symbol Δ represents the result of the copolymer of Example 2.

Next, the relationship between the solution temperature and the light transmittance of the polymer aqueous solution at a salt concentration of 1.0 M and a polymer concentration of 0.5 to 3.0 g/L was investigated. The change in the light transmittance in the course of cooling is shown in FIG. 5B, from which it is obvious that the phase transition temperature can be easily controlled via the polymer concentration as in Example 1. Since the dependency of the phase transition behavior on the polymer concentration and the salt concentration is different from that in Example 1, it is obvious that the phase transition behavior can be controlled via the molecular weight of the polymer.

<Confirmation of Temperature Responsiveness of Polymer: Dynamic Light Scattering Measurement>

A sample solution having a polymer concentration of 2.0 g/L and a salt concentration of 1.0 M was prepared, and the temperature dependency of the hydrodynamic radius (Rh) and scattered intensity (SI) in the course of cooling was investigated. As shown in FIG. 6B, in the vicinity of the phase transition, that is, at 50° C. or less, Rh and SI abruptly increased. This temperature well coincided with the phase transition temperature in the light transmittance measurement described above.

As in Example 1, at the phase transition temperature or more, Rh was 4.0 nm and SI was 161 kcps, which were small and constant. Thus, it was suggested that the polymer was dissolved in a unimer state at the phase transition temperature or more.

Example 3 Common Radical Polymerization Method NaSS/VBTAC

<Synthesis of NaSS/VBTAC Copolymer>

VBTAC (2.00 g, 9.35 mmol), NaSS (2.15 g, 9.35 mmol, manufactured by Tosoh Finechem Corporation, purity: 88.6%), an initiator V-50 (50.0 mg, 0.18 mmol), a chain transfer agent thioglycerol (220.0 mg, 2.03 mmol), and ion exchange water (75.0 g) were placed in a 100 mL glass four-neck flask fitted with a nitrogen introducing tube, a three-way cock, and a Dimroth condenser and dissolved to prepare a homogeneous solution (monomer molar ratio [VBTAC]/[NaSS]=50/50). After this solution was sufficiently degassed by repeated aspirator pressure reduction and nitrogen introduction, polymerization was conducted under a nitrogen atmosphere with stirring by a magnetic stirrer at 60° C. for 24 hours.

At the completion of the reaction, the polymerization conversion ratio of each monomer was 100%, the number average molecular weight was 600, and the weight average molecular weight was 1,100. The polymer was soluble in a gel permeation chromatography (GPC) eluant (sodium sulfate aqueous solution (0.05 mol/L)/acetonitrile=65/35 (volume ratio) solution), and the measurements of the polymerization conversion ratio and the number average molecular weight were calculated from the peak area ratio obtained by GPC.

The polymer solution was a transparent solution at the reaction temperature 60° C. but became insoluble and clouded around 55° C. on cooling and became a transparent solution again on reheating to 60° C. Thus, it is obvious that the polymer obtained from a common solution radical also has an UCST property as the polymers of Examples 1 and 2.

<Evaluation of Hydrolytic Resistance of NaSS/VBTAC Copolymer>

30 ml of the polymer solution described above was placed in a 50 mL glass four-neck flask fitted with a nitrogen introducing tube, a three-way cock, and a Dimroth condenser and heated with stirring by a magnetic stirrer at 95° C. for 100 hours. When the GPC before heating and the GPC after heating were compared, no change in the peak shapes was observed, and the peaks tops also did not change. The UCST was observed around 55° C. also after heating, and it is thus obvious that the polymer is excellent in hydrolytic resistance.

Example 4 Common Radical Polymerization Method NaSS/VBTAC Copolymer (Solvent Changed)

VBTAC (2.50 g, 11.68 mmol), NaSS (2.71 g, 11.68 mmol, manufactured by Tosoh Finechem Corporation, purity: 88.8%), an initiator V-50 (200.0 mg, 0.74 mmol), a chain transfer agent thioglycerol (100.0 mg, 0.92 mmol), ion exchange water (65.0 g), and acetonitrile (35.0 g) were placed in a 200 mL glass four-neck flask fitted with a nitrogen introducing tube, a three-way cock, and a Dimroth condenser and dissolved to prepare a homogeneous solution (monomer molar ratio [VBTAC]/[NaSS]=50/50). After this solution was sufficiently degassed by repeated aspirator pressure reduction and nitrogen introduction, polymerization was conducted under a nitrogen atmosphere with stirring by a magnetic stirrer at 60° C. for 24 hours.

At the completion of the reaction, the polymerization conversion ratio of each monomer was 99%, the number average molecular weight was 1,100, and the weight average molecular weight was 2,200. The resulting copolymer (mixture solvent of ion exchange water and acetonitrile) was a transparent homogeneous solution both during the reaction and during cooling to room temperature.

After the completion of the reaction, the resulting copolymer was transferred into a 300 ml eggplant flask, and acetonitrile was evaporated with an evaporator. The polymer aqueous solution from which acetonitrile was completely evaporated was a transparent homogeneous solution at 60° C. but became insoluble and clouded around 55° C. on cooling and became a transparent homogeneous solution again on reheating to 60° C. Thus, it is obvious that the polymer also has an UCST property as in Examples 1 to 3.

The polymer was soluble in a GPC eluant (sodium sulfate aqueous solution (0.05 mol/L))/acetonitrile=65/35 (volume ratio) solution), and the measurements of the polymerization conversion ratio and the number average molecular weight were calculated from the peak area ratio obtained by gel permeation chromatography (GPC)

Example 5 NaSS/VBTAC/St Copolymer (1)

VBTAC (2.70 g, 12.62 mmol), NaSS (2.94 g, 12.62 mmol, manufactured by Tosoh Finechem Corporation, purity: 88.5%), St (0.14 g, 1.32 mmol), an initiator V-50 (260.0 mg, 0.96 mmol), a chain transfer agent thioglycerol (260.0 mg, 2.36 mmol), ion exchange water (49.0 g), and 2-propanol (49.0 g) were placed in a 200 mL glass four-neck flask fitted with a nitrogen introducing tube, a three-way cock, and a Dimroth condenser and dissolved to prepare a homogeneous solution (monomer molar ratio [VBTAC]/[NaSS]/[St]=47.5/47.5/5.0). After this solution was sufficiently degassed by repeated aspirator pressure reduction and nitrogen introduction, polymerization was conducted under a nitrogen atmosphere with stirring by a magnetic stirrer at 60° C. for 24 hours. At the completion of the reaction, the polymerization conversion ratio of each monomer was 99%, the number average molecular weight was 800, and the weight average molecular weight was 1,700. The resulting copolymer (mixture solvent of ion exchange water and 2-propanol) was a transparent homogeneous solution both during the reaction and during cooling to room temperature.

After the completion of the reaction, the resulting copolymer was transferred into a 300 ml eggplant flask, and 2-propanol was evaporated with an evaporator. The polymer aqueous solution from which 2-propanol was completely evaporated was a transparent homogeneous solution at 80° C. but became insoluble and clouded on cooling around 72° C. and became a transparent homogeneous solution again on reheating to 80° C. Thus, it is obvious that the polymer also has an UCST property as the polymers of Examples 1 to 4. Note that, in the present Example, copolymerization of styrene, which is a hydrophobic nonionic monomer, is considered to have raised the UCST.

The polymer was soluble in a gel permeation chromatography (GPC) eluant (sodium sulfate aqueous solution (0.05 mol/L)/acetonitrile=65/35 (volume ratio) solution), and the measurements of the polymerization conversion ratio and the number average molecular weight were calculated from the peak area ratio obtained by GPC.

Example 6 NaSS/VBTAC/St Copolymer (2)

VBTAC (2.70 g, 12.63 mmol), NaSS (2.94 g, 12.63 mmol, manufactured by Tosoh Finechem Corporation, purity: 88.6%), St (0.25 g, 2.38 mmol), an initiator V-50

(300.0 mg, 1.07 mmol), a chain transfer agent thioglycerol (280.0 mg, 2.51 mmol), ion exchange water (60.00 g), and 2-propanol (60.00 g) were placed in a 200 mL glass four-neck flask equipped with a nitrogen introducing tube, a three-way cock, a Dimroth condenser, and a magnetic stirrer and dissolved to prepare a homogeneous solution (ionic monomer molar ratio [VBTAC]/[NaSS]=50/50, St content in the total monomers=8.6 mol %). After this solution was sufficiently degassed by repeated aspirator pressure reduction and nitrogen introduction, polymerization was conducted under a nitrogen atmosphere with stirring at 60° C. for 24 hours. At the completion of the reaction, the polymerization conversion ratio of each monomer was 99%, the number average molecular weight was 900, and the weight average molecular weight was 1,800. The resulting copolymer (mixture solvent of ion exchange water and 2-propanol) was a transparent homogeneous solution both during the reaction and during cooling to room temperature.

After the completion of the reaction, the resulting copolymer was transferred into a 300 ml eggplant flask, and 2-propanol was evaporated with an evaporator. The polymer aqueous solution from which 2-propanol was completely evaporated was a transparent homogeneous solution at 80° C. but became insoluble and clouded on cooling around 75° C. and became a transparent homogeneous solution again on reheating to 80° C. Thus, it is obvious that the polymer also has an UCST property as in Examples 1 to 5.

Example 7 NaSS/MAA/VBTAC Copolymer

Ion exchange water (35.00 g), MAA (0.26 g, 2.99 mmol), 1 N sodium hydroxide (2.00 g, 2.00 mmol), VBTAC (3.15 g, 14.73 mmol), NaSS (2.72 g, 11.69 mmol, manufactured by Tosoh Finechem Corporation, purity: 88.6%), an initiator V-50 (300.0 mg, 1.07 mmol), and a chain transfer agent thioglycerol (150.0 mg, 1.35 mmol) were placed in a 100 mL glass four-neck flask equipped with a nitrogen introducing tube, a three-way cock, a Dimroth condenser, and a magnetic stirrer and dissolved to prepare a homogeneous solution (ionic monomer molar ratio [VBTAC]/[NaSS+MAA]=50/50). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 100%, the number average molecular weight was 1,200, and the weight average molecular weight was 2,400.

The polymer solution was a transparent solution at the reaction temperature 60° C. but became insoluble and clouded on cooling around 40° C. and became a transparent solution again on reheating to 50° C. Thus, it is obvious that the polymer has an UCST property.

Example 8 NaSS/2VP Copolymer

Ion exchange water (51.00 g) was placed in a 1 L glass four-neck flask (reactor) equipped with a nitrogen introducing tube, a three-way cock, a Dimroth condenser, and a magnetic stirrer, and oxygen in the system was removed under a nitrogen flow. 1 N hydrochloric acid (375.00 g, 375.0 mmol), ion exchange water (300.00 g), 2VP (40.00 g, 369.03 mmol), NaSS (86.00 g, 369.53 mmol, manufactured by Tosoh Finechem Corporation, purity: 88.6%), and a chain transfer agent thioglycerol (2.90 g, 26.01 mmol) were collected in another 1 L glass two-neck flask and completely dissolved. Then, an initiator V-50 (3.20 g, 11.45 mmol) was added thereto and dissolved (molar ratio of ionic monomer [2VP]/[NaSS]=50/50). This solution was sufficiently degassed by repeated aspirator pressure reduction and nitrogen introduction and used as a monomer solution for dropping. Polymerization was conducted at 85° C. while this monomer solution was added dropwise to the reactor under a nitrogen atmosphere using a metering pump over 3 hours. Thereafter, aging was conducted at 85° C. for 2 hours.

At the completion of the reaction, the polymerization conversion ratio of each monomer was 100%, the number average molecular weight was 9,300, and the weight average molecular weight was 19,400.

The polymer solution was a transparent solution around a reaction temperature of 70° C. but became insoluble and clouded around 60° C. on cooling and became a transparent solution again on reheating to 70° C. Thus, it is obvious that the polymer has an UCST property.

Example 9 NaSS/4VP Copolymer

Ion exchange water (65.00 g) and 4VP (1.50 g, 13.70 mmol) were placed in a 100 mL glass four-neck flask equipped with a nitrogen introducing tube, a three-way cock, a Dimroth condenser, and a magnetic stirrer, and then 1 N hydrochloric acid (15.00 g, 15.0 mmol) was added thereto under ice cooling to neutralize 4VP. Thereafter, NaSS (3.15 g, 13.54 mmol, manufactured by Tosoh Finechem Corporation, purity: 88.6%), an initiator V-50 (250.0 mg, 0.89 mmol), and a chain transfer agent thioglycerol (120.0 mg, 1.08 mmol) were added thereto and dissolved to prepare a homogeneous solution (ionic monomer molar ratio [4VP]/[NaSS]=50/50). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 100%, the number average molecular weight was 1,300, and the weight average molecular weight was 2,600.

The polymer solution was a transparent solution at the reaction temperature 60° C. but became insoluble and clouded around 50° C. on cooling and became a transparent solution again on reheating to 60° C. Thus, it is obvious that the polymer has an UCST property.

Example 10 NaSS/4VP/St Copolymer

Ion exchange water (30.0 g), 2-propanol (40.0 g), and 4VP (1.35 g, 12.33 mmol) were placed in a 200 mL glass four-neck flask equipped with a nitrogen introducing tube, a three-way cock, a Dimroth condenser, and a magnetic stirrer, and then 1 N hydrochloric acid (13.50 g, 13.50 mmol) was added thereto under ice cooling to neutralize 4VP. Thereafter, NaSS (2.85 g, 12.25 mmol, manufactured by Tosoh Finechem Corporation, purity: 88.6%), St (0.14 g, 1.33 mmol), an initiator V-50 (250.0 mg, 0.89 mmol), and a chain transfer agent thioglycerol (260.0 mg, 2.33 mmol) were added thereto and dissolved to prepare a homogeneous solution (ionic monomer molar ratio [4VP]/[NaSS]=50/50, St content in the total monomers=5.1 mol %). After this solution was sufficiently degassed by repeated aspirator pressure reduction and nitrogen introduction, polymerization was conducted under a nitrogen atmosphere with stirring at 60° C. for 24 hours. At the completion of the reaction, the polymerization conversion ratio of each monomer was 99%, the number average molecular weight was 1,000, and the weight average molecular weight was 1,900. The resulting copolymer (mixture solvent of ion exchange water and 2-propanol) was a transparent homogeneous solution both during the reaction and during cooling to room temperature.

After the completion of the reaction, the resulting copolymer was transferred into a 300 ml eggplant flask, and 2-propanol was evaporated with an evaporator. The polymer aqueous solution from which 2-propanol was completely evaporated was a transparent homogeneous solution at 80° C. but became insoluble and clouded around 68° C. on cooling and became a transparent homogeneous solution again on reheating to 75° C. Thus, it is obvious that the polymer has an UCST property. Note that, in the present Example, copolymerization of styrene, which is a hydrophobic nonionic monomer, is considered to have raised the UCST.

Example 11 NaSS/2VP/VBTAC Copolymer

Ion exchange water (80.00 g), 1 N hydrochloric acid (6.70 g, 6.70 mmol), 2VP (0.70 g, 6.46 mmol), VBTAC (1.25 g, 5.85 mmol), and NaSS (2.85 g, 12.25 mmol, manufactured by Tosoh Finechem Corporation, purity: 88.6%), an initiator V-50 (250.0 mg, 0.89 mmol), and a chain transfer agent thioglycerol (120.0 mg, 1.08 mmol) were placed in a 100 mL glass four-neck flask equipped with a nitrogen introducing tube, a three-way cock, a Dimroth condenser, and a magnetic stirrer and dissolved to prepare a homogeneous solution (ionic monomer molar ratio [2VP+VBTAC]/[NaSS]=50/50). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 100%, the number average molecular weight was 1,800, and the weight average molecular weight was 3,900.

The polymer solution was a transparent solution at the reaction temperature 60° C. but became insoluble and clouded around 55° C. on cooling and became a transparent solution again on reheating to 60° C. Thus, it is obvious that the polymer has an UCST property.

Example 12 NaSS/Quaternized 4VP Copolymer

4VP (1.38 g, 12.60 mmol), ethyl bromide (purity: 99%, manufactured by Tokyo Chemical Industry Co., Ltd.) (1.39 g, 12.63 mmol), acetonitrile (35.0 g), ion exchange water (65.0 g), NaSS (2.85 g, 12.25 mmol, manufactured by Tosoh Finechem Corporation, purity: 88.6%), and a chain transfer agent thioglycerol (120.0 mg, 1.08 mmol) were added in a 200 mL glass four-neck flask equipped with a nitrogen introducing tube, a three-way cock, a Dimroth condenser, and a magnetic stirrer and stirred under a nitrogen atmosphere at 50° C. for 10 hours to prepare a homogeneous solution (ionic monomer molar ratio [4VP]/[NaSS]=51/49). After the solution was cooled to normal temperature, an initiator V-50 (110.0 mg, 0.39 mmol) was added thereto. Then, after sufficient degassing was conducted by repeated aspirator pressure reduction and nitrogen introduction, polymerization was conducted with stirring at 60° C. for 10 hours.

At the completion of the reaction, the polymerization conversion ratio of each monomer was 100%, the number average molecular weight was 1,900, and the weight average molecular weight was 4,100. The resulting copolymer (mixture solvent of ion exchange water and acetonitrile) was a transparent homogeneous solution both during the reaction and during cooling to room temperature.

After the completion of the reaction, the resulting copolymer was transferred into a 300 ml eggplant flask, and acetonitrile was evaporated with an evaporator. The polymer aqueous solution from which acetonitrile was completely evaporated was a transparent homogeneous solution at 60° C. but became insoluble and clouded around 55° C. on cooling and became a transparent homogeneous solution again on reheating to 60° C. Thus, it is obvious that the polymer also has an UCST property as in Examples 1 to 11.

Example 13 NaSS/Quaternized 4VP/St Copolymer

4VP (1.38 g, 12.60 mmol), ethyl bromide (purity: 99%, manufactured by Tokyo Chemical Industry Co., Ltd., 1.39 g, 12.63 mmol), St (0.14 g, 1.33 mmol), 2-propanol (55.0 g), ion exchange water (65.0 g), NaSS (2.85 g, 12.25 mmol, manufactured by Tosoh Finechem Corporation, purity: 88.6%), and a chain transfer agent thioglycerol (120.0 mg, 1.08 mmol) were placed in a 200 mL glass four-neck flask equipped with a nitrogen introducing tube, a three-way cock, a Dimroth condenser, and a magnetic stirrer and stirred under a nitrogen atmosphere at 50° C. for 10 hours (ionic monomer molar ratio [4VP]/[NaSS]=51/49, St content in the total monomers=5.0 mol %). After the stirred product was cooled to room temperature, an initiator V-50 (250.0 mg, 0.89 mmol) was added thereto. Then, after sufficient degassing was conducted by repeated aspirator pressure reduction and nitrogen introduction, polymerization was conducted with stirring at 60° C. for 24 hours.

At the completion of the reaction, the polymerization conversion ratio of each monomer was 99%, the number average molecular weight was 1,700, and the weight average molecular weight was 3,500. The resulting copolymer (mixture solvent of ion exchange water and acetonitrile) was a transparent homogeneous solution both during the reaction and during cooling to room temperature.

After the completion of the reaction, the resulting copolymer was transferred into a 300 ml eggplant flask, and 2-propanol was evaporated with an evaporator. The polymer aqueous solution from which acetonitrile was completely evaporated was a transparent homogeneous solution at 70° C. but became insoluble and clouded around 60° C. on cooling and became a transparent homogeneous solution again on reheating to 70° C. Thus, it is obvious that the polymer has an UCST property.

Example 14 LiSS/VBTAC Copolymer

VBTAC (2.00 g, 9.35 mmol), LiSS (2.05 g, 9.27 mmol, manufactured by Tosoh Finechem Corporation, purity: 86.00%), an initiator V-50 (200.0 mg, 0.715 mmol), a chain transfer agent thioglycerol (60.0 mg, 0.538 mmol), and an ion exchange water (75.0 g) were placed in a 200 mL glass four-neck flask equipped with a nitrogen introducing tube, a three-way cock, a Dimroth condenser, and a magnetic stirrer and dissolved to prepare a homogeneous solution (ionic monomer molar ratio [VBTAC]/[LiSS]=50/50). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 100%, the number average molecular weight was 1,400, and the weight average molecular weight was 2,600.

The polymer solution was a transparent solution at the reaction temperature 60° C. but became insoluble and clouded around 55° C. on cooling and became a transparent solution again on reheating to 60° C. Thus, it is obvious that the polymer has an UCST property.

Example 15 NaSS/4VP/αMSt Copolymer

Ion exchange water (30.0 g), 2-propanol (40.0 g), and 4VP (1.35 g, 12.33 mmol) were placed in a 200 mL glass four-neck flask equipped with a nitrogen introducing tube, a three-way cock, a Dimroth condenser, and a magnetic stirrer, and then 1 N hydrochloric acid (13.50 g, 13.50 mmol) was added thereto under ice cooling to neutralize 4VP. Thereafter, NaSS (2.85 g, 12.25 mmol, manufactured by Tosoh Finechem Corporation, purity: 88.6%), αMSt (0.14 g, 1.17 mmol), an initiator V-50 (250.0 mg, 0.89 mmol), and a chain transfer agent thioglycerol (260.0 mg, 2.33 mmol) were added thereto and dissolved to prepare a homogeneous solution (ionic monomer molar ratio [4VP]/[NaSS]=50/50, αMSt content in the total monomers=4.8 mol %). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 99%, the number average molecular weight was 1,200, and the weight average molecular weight was 2,300. The resulting copolymer (mixture solvent of ion exchange water and 2-propanol) was a transparent homogeneous solution both during the reaction and during cooling to room temperature.

After the completion of the reaction, the resulting copolymer was transferred into a 300 ml eggplant flask, and 2-propanol was evaporated with an evaporator. The polymer aqueous solution from which 2-propanol was completely evaporated was a transparent homogeneous solution at 80° C. but became insoluble and clouded around 70° C. on cooling and became a transparent homogeneous solution again on reheating to 80° C. Thus, it is obvious that the polymer has an UCST property. Note that, in the present Example, copolymerization of styrene, which is a hydrophobic nonionic monomer, is considered to have raised the UCST.

Example 16 NaSS/2VP Copolymer

Ion exchange water (10.0 g) and 2VP (4.00 g, 36.90 mmol) were placed in a 200 mL glass four-neck flask equipped with a nitrogen introducing tube, a three-way cock, a Dimroth condenser, and a magnetic stirrer, and then 1 N hydrochloric acid (36.90 g, 36.90 mmol) was added thereto under ice cooling to neutralize 2VP. Thereafter, NaSS (8.59 g, 36.91 mmol, manufactured by Tosoh Finechem Corporation, purity: 88.6%), an initiator V-50 (203.0 mg, 0.73 mmol), and a chain transfer agent thioglycerol (201.0 mg, 1.80 mmol) were added thereto (ionic monomer molar ratio [2VP]/[NaSS]=50/50). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 99%, the number average molecular weight was 54,000, and the weight average molecular weight was 120,000. The resulting copolymer was a yellowish white heterogeneous solution both during the reaction and during cooling to room temperature. When the resulting copolymer solution was heated as it was to 80° C., the copolymer solution became a pale yellow homogeneous solution at 80° C. However, the solution became insoluble and clouded around 70° C. on cooling and became a pale yellow homogeneous solution again on reheating to 80° C. Thus, it is obvious that the polymer has an UCST property. It is considered that the UCST rose because the polymer was caused to have a higher molecular weight in the present Example, in comparison with Example 8.

Example 17 Application as Draw Solution (1)

<Synthesis of NaSS/VBTAC Copolymer>

Ion exchange water (55.0 g) was placed in a 1 L glass four-neck flask (reactor) equipped with a nitrogen introducing tube, a three-way cock, a Dimroth condenser, and a magnetic stirrer, and oxygen in the system was removed under a nitrogen flow. VBTAC (54.98 g, 257.04 mmol), NaSS (59.17 g, 254.24 mmol, manufactured by Tosoh Finechem Corporation, purity: 88.6%), an initiator V-50 (6.80 g, 24.32 mmol), a chain transfer agent thioglycerol (1.54 g, 13.81 mmol), and ion exchange water (551.30 g) were collected in another 1 L glass two-neck flask and dissolved to prepare a homogeneous solution (molar ratio of ionic monomer [VBTAC]/[NaSS]=50/50). This solution was sufficiently degassed by repeated aspirator pressure reduction and nitrogen introduction and used as a monomer solution for dropping. Polymerization was conducted at 70° C. while this monomer solution was added dropwise to the reactor under a nitrogen atmosphere using a metering pump over 3 hours. Thereafter, aging was conducted at 70° C. for 5 hours. The polymerization conversion ratio of each monomer was 100% at the completion of the reaction.

After the reaction solution was left to stand at 25° C. overnight, the supernatant was discarded by decantation. The polymer solution collected was concentrated by a rotary evaporator, then spread on a tray made of a fluororesin, and dried under vacuum at 105° C. for 10 hours to provide 99.6 g of a dried polymer. The dried polymer was soluble in a gel permeation chromatography (GPC) eluant (sodium sulfate aqueous solution (0.05 mol/L)/acetonitrile=65/35 (volume ratio) solution), the number average molecular weight was 1,000, and the weight average molecular weight was 2,300.

<Phase Equilibrium of Polymer Solution>

Ion exchange water and the dried polymer each in a predetermined amount were mixed, and heated until complete dissolution. Thereafter, the change in the light transmittance (abrupt decrease in the transmittance=temperature at which the phase is separated) was measured while the solution was left to cool, and the phase equilibrium diagram of the polymer aqueous solution was created. As shown in FIG. 7, it is obvious that the polymer is dissolved in water over a wide temperature range at a high concentration and dissolved only in water over a narrow temperature range at a low concentration.

<Measurement of Osmotic Pressure>

20 to 50 wt % polymer aqueous solutions were prepared in the same manner as described above, each water activity at 50° C. was measured, and the osmotic pressure at 50° C. was calculated by the conversion equation.

Figure 8:
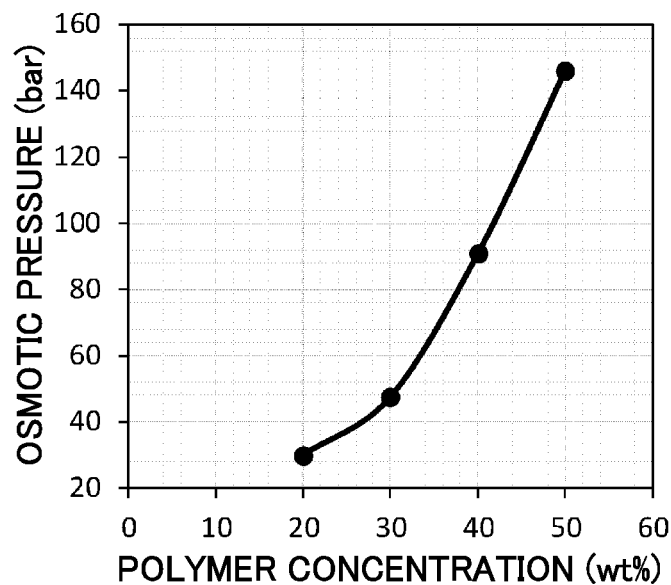
FIG. 8 shows the osmotic pressure of a polymer aqueous solution prepared in Example 17, measured at 50° C. The horizontal axis represents the polymer concentration in water (wt %), and the vertical axis represents the osmotic pressure (bar).

As shown in FIG. 8, the osmotic pressure of the 20 wt % polymer aqueous solution was 30 bar, whereas the osmotic pressure of the 50 wt % polymer aqueous solution was as high as 146 bar and sufficiently higher than the osmotic pressure of a 3.5 wt % sodium chloride aqueous solution (corresponding to seawater), which was 30 bar. That is, the 50 wt % solution of the polymer has a higher osmotic pressure than that of warm seawater. Thus, it is possible for the 50 wt % solution to absorb water from warm seawater via a forward osmosis (semipermeable) membrane even if a high pressure is not applied to the warm seawater side as in the case of a reverse osmosis membrane. For example, the polymer solution that has absorbed water and has a concentration decreased to 20 wt %, as shown in FIG. 7, is separated into two phases when cooled to at least 40° C. Thus, the polymer solution can be separated into fresh water and a concentrated solution of the polymer. Accordingly, the concentrated solution of the polymer can be used as a draw solution for forward osmosis membrane water treatment systems. The polymer is excellent in hydrolytic resistance as shown in Example 3. Thus it is considered that the polymer can be reused repeatedly over a long period.

Example 18 Application as Draw Solution (2)

<Synthesis of NaSS/VBTAC/St Copolymer>

Ion exchange water (80.0 g) and 2-propanol (80.0 g) were placed in a 3 L glass four-neck flask (reactor) equipped with a nitrogen introducing tube, a three-way cock, a Dimroth condenser, and a magnetic stirrer, and oxygen in the system was removed under a nitrogen flow. VBTAC (54.0 g, 252.49 mmol), NaSS (58.6 g, 251.79 mmol, manufactured by Tosoh Finechem Corporation, purity: 88.6%), St (2.80 g, 26.62 mmol), an initiator V-50 (6.80 g, 25.07 mmol), a chain transfer agent thioglycerol (5.20 g, 46.64 mmol), ion exchange water (900.00 g), and 2-propanol (900.00 g) were collected in another 3 L glass two-neck flask and dissolved to prepare a homogeneous solution (ionic monomer molar ratio [VBTAC]/[NaSS]=50/50, St content in the total monomers=5.01 mol %). This solution was sufficiently degassed by repeated aspirator pressure reduction and nitrogen introduction and used as a monomer solution for dropping. Polymerization was conducted at 75° C. while this monomer solution was added dropwise to the reactor under a nitrogen atmosphere using a metering pump over 3 hours. Thereafter, aging was conducted at 75° C. for 5 hours. The polymerization conversion ratio of each monomer was 100% at the completion of the reaction.

After a total of 960 g of 2-propanol and water was evaporated from the polymer solution using a rotary evaporator, the solution was left to stand at 25° C. overnight, and then the supernatant was discarded by decantation. The polymer solution collected was spread on a tray made of a fluororesin and dried under vacuum at 105° C. for 10 hours to provide 101.20 g of a dried polymer. The dried polymer was soluble in a gel permeation chromatography (GPC) eluant (sodium sulfate aqueous solution (0.05 mol/L)/acetonitrile=65/35 (volume ratio) solution), the number average molecular weight was 1,000, and the weight average molecular weight was 1,900.

<Phase Equilibrium of Polymer Solution>

Figure 9:
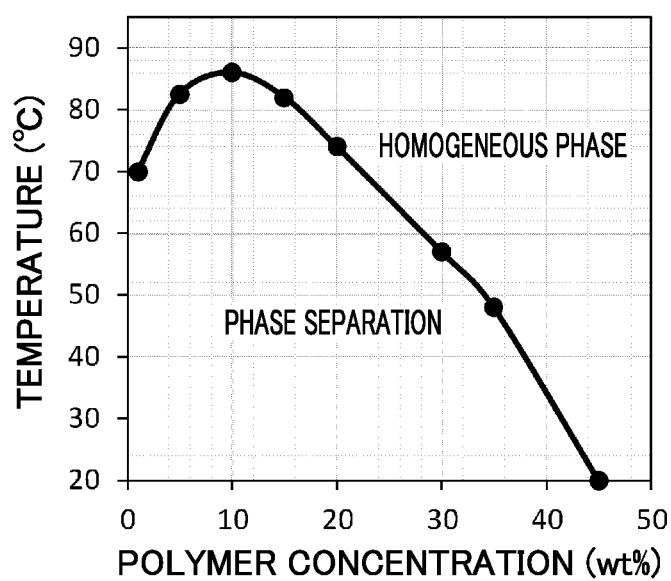
FIG. 9 shows the phase equilibrium of a polymer aqueous solution prepared in Example 18. The horizontal axis represents the polymer concentration (wt %), and the vertical axis represents the temperature (° C.). The upper part of the curve shown in the figure is a homogeneous phase, and the lower part thereof is a region where the solution is separated into two phases (the polymer becomes insoluble).

Ion exchange water and the dried polymer described above each in a predetermined amount were mixed, and heated until complete dissolution. Thereafter, the change in the light transmittance (abrupt decrease in the transmittance=temperature at which the polymer precipitates) was measured while the solution was slowly cooled, and the phase equilibrium diagram of the polymer aqueous solution was created. As shown in FIG. 9, it is obvious that the polymer is dissolved in water over a wide temperature range at a high concentration and dissolved only in water over a narrow temperature range at a low concentration. Although the molecular weight was smaller than that in Example 17, the phase transition temperature increased. It is considered that this is because the hydrophobic St was copolymerized.

<Evaluation of Hydrolytic Resistance of Polymer>

30 ml of a 20 wt % solution of the polymer described above was placed in a 50 mL glass four-neck flask fitted with a nitrogen introducing tube, a three-way cock, and a Dimroth condenser and heated with stirring by a magnetic stirrer at 95° C. for 100 hours. When the GPC before heating and the GPC after heating were compared, no change in the peak shapes was observed, and the peaks tops also did not change. The phase transition temperature was observed around 75° C. also after heating, and it is thus obvious that the polymer is excellent in hydrolytic resistance.

<Measurement of Osmotic Pressure>

30 to 50 wt % polymer aqueous solutions were prepared in the same manner as described above, each water activity at 50° C. was measured, and the osmotic pressure was calculated by the conversion equation.

Figure 10:
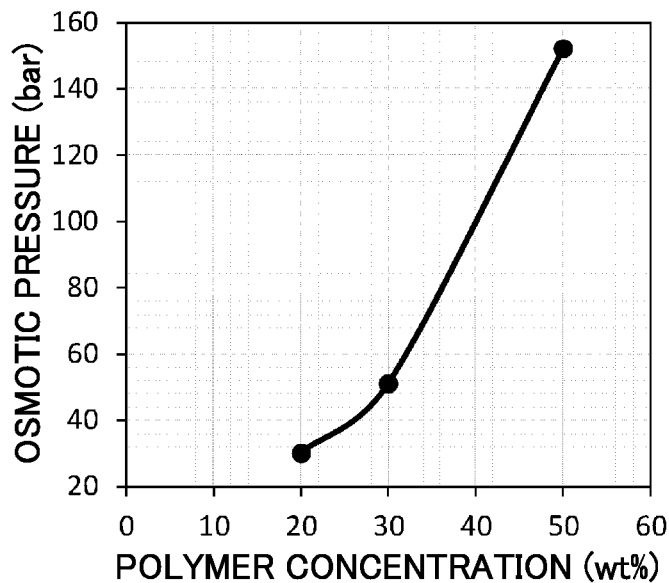
FIG. 10 shows the osmotic pressure of a polymer aqueous solution prepared in Example 18, measured at 50° C. The horizontal axis represents the polymer concentration in water (wt %), and the vertical axis represents the osmotic pressure (bar).

As shown in FIG. 10, the osmotic pressure of the 30 wt % polymer aqueous solution was 30 bar, whereas the osmotic pressure of the 50 wt % polymer aqueous solution was as high as 152 bar and sufficiently higher than the osmotic pressure of a 3.5 wt % sodium chloride aqueous solution (corresponding to seawater), which was 30 bar. That is, the 50 wt % solution of the polymer has a higher osmotic pressure than that of warm seawater. Thus, it is possible for the 50 wt % solution to absorb water from warm seawater via a forward osmosis (semipermeable) membrane even if a high pressure is not applied to the warm seawater side as in the case of a reverse osmosis membrane. For example, the polymer solution that has absorbed water and has a concentration decreased to 30 wt %, as shown in FIG. 9, is separated into two phases when cooled to at least 55° C. Thus, the polymer solution can be separated into fresh water and a concentrated solution of the polymer. Accordingly, the concentrated solution of the polymer can be used as a draw solution for forward osmosis membrane water treatment systems. Further, the polymer is excellent in hydrolytic resistance, and thus it is considered that the polymer can be reused repeatedly over a long period.

Example 19 Application as Draw Solution (3)

<Synthesis of LiSS/4VP/St Copolymer>

Ion exchange water (80.0 g) and 2-propanol (80.0 g) were placed in a 3 L glass four-neck flask (reactor) equipped with a nitrogen introducing tube, a three-way cock, a Dimroth condenser, and a magnetic stirrer, and oxygen in the system was removed under a nitrogen flow. Ion exchange water (850.00 g), 1 N hydrochloric acid (282.00 g, 282.0 mmol), and 2-propanol (1120.00 g) were collected in another 3 L two-neck glass flask, and then 4VP (30.60 g, 279.399 mmol) was slowly added thereto. After the solution was cooled to normal temperature, LiSS (61.50 g, 278.16 mmol, manufactured by Tosoh Finechem Corporation, purity: 86.0%), St (3.60 g, 30.16 mmol), an initiator V-50 (7.50 g, 26.83 mmol), and a chain transfer agent thioglycerol (1.80 g, 16.14 mmol) were added thereto and dissolved to prepare a homogeneous solution (ionic monomer molar ratio [4VP]/[LiSS]=50/50, St content in the total monomers=5.13 mol %). This solution was sufficiently degassed by repeated aspirator pressure reduction and nitrogen introduction and used as a monomer solution for dropping. Polymerization was conducted at 75° C. while this monomer solution was added dropwise to the reactor under a nitrogen atmosphere using a metering pump over 3 hours. Thereafter, aging was conducted at 75° C. for 5 hours. The polymerization conversion ratio of each monomer was 100% at the completion of the reaction.

After a total of 960 g of 2-propanol and water was evaporated from the polymer solution using a rotary evaporator, the solution was left to stand at 25° C. overnight, and then the supernatant was discarded by decantation. The polymer solution collected was spread on a tray made of a fluororesin and dried under vacuum at 105° C. for 10 hours to provide 101.20 g of a dried polymer. The dried polymer was soluble in a gel permeation chromatography (GPC) eluant (sodium sulfate aqueous solution (0.05 mol/L)/acetonitrile=65/35 (volume ratio) solution), the number average molecular weight was 1,200, and the weight average molecular weight was 2,300.

<Phase Equilibrium of Polymer Solution>

Figure 11:
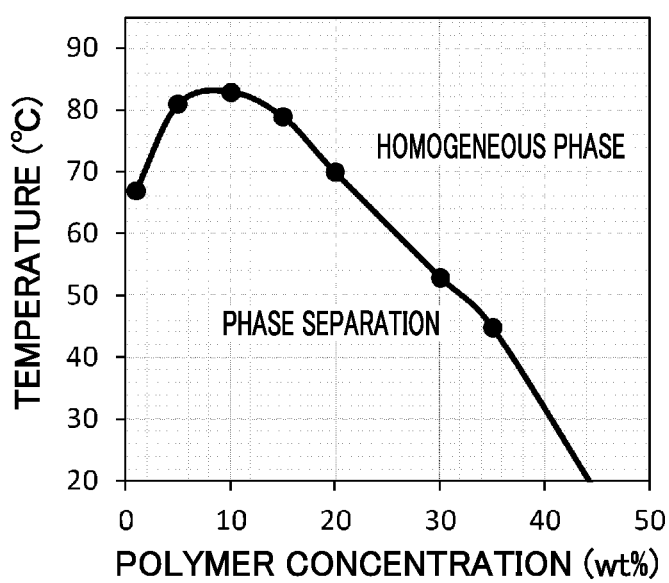
FIG. 11 shows the phase equilibrium of a polymer aqueous solution prepared in Example 19. The horizontal axis represents the polymer concentration (wt %), and the vertical axis represents the temperature (° C.). The upper part of the curve shown in the figure is a homogeneous phase, and the lower part thereof is a region where the solution is separated into two phases (the polymer becomes insoluble).

Ion exchange water and the dried polymer described above each in a predetermined amount were mixed, and heated until complete dissolution. Thereafter, the change in the light transmittance (abrupt decrease in the transmittance=temperature at which the polymer precipitates) was measured while the solution was slowly cooled, and the phase equilibrium diagram of the polymer aqueous solution was created. As shown in FIG. 11, it is obvious that the polymer is dissolved in water over a wide temperature range at a high concentration and dissolved only in water over a narrow temperature range at a low concentration.

<Evaluation of Hydrolytic Resistance of Polymer>

30 ml of a 20 wt % solution of the polymer described above was placed in a 50 mL glass four-neck flask fitted with a nitrogen introducing tube, a three-way cock, and a Dimroth condenser and heated with stirring by a magnetic stirrer at 95° C. for 100 hours. When the GPC before heating and the GPC after heating were compared, no change in the peak shapes was observed, and the peaks tops also did not change. The phase transition temperature was observed around 70° C. also after heating, and it is thus obvious that the polymer is excellent in hydrolytic resistance.

<Measurement of Osmotic Pressure>

30 to 50 wt % polymer aqueous solutions were prepared in the same manner as described above, each water activity at 50° C. was measured, and the osmotic pressure was calculated by the conversion equation.

Figure 12:
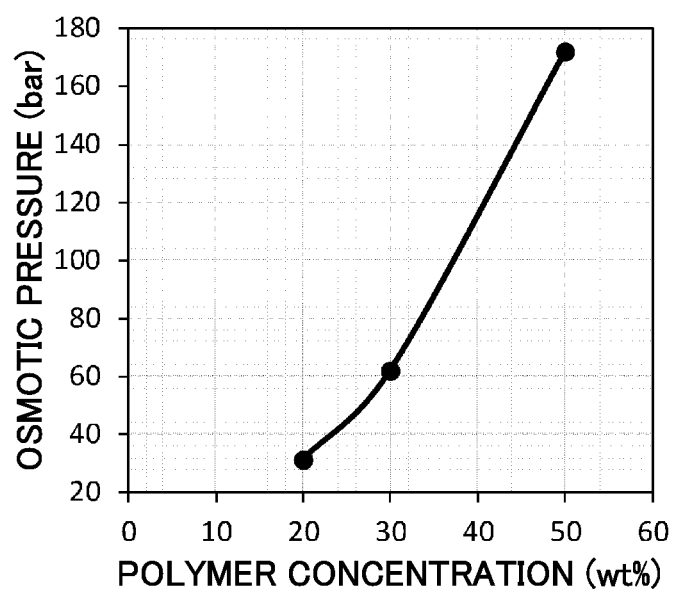
FIG. 12 shows the osmotic pressure of a polymer aqueous solution prepared in Example 19, measured at 50° C. The horizontal axis represents the polymer concentration in water (wt %), and the vertical axis represents the osmotic pressure (bar).

As shown in FIG. 12, the osmotic pressure of the 30 wt % polymer aqueous solution was 31 bar, whereas the osmotic pressure of the 50 wt % polymer aqueous solution was as high as 172 bar and sufficiently higher than the osmotic pressure of a 3.5 wt % sodium chloride aqueous solution (corresponding to seawater), which was 30 bar. It is presumed that the osmotic pressure higher than those in Examples 16 and 17 was exhibited because of the effect of lithium ions. That is, the 50 wt % solution of the polymer has a higher osmotic pressure than that of warm seawater. Thus, it is possible for the 50 wt % solution to absorb water from warm seawater via a forward osmosis (semipermeable) membrane even if a high pressure is not applied to the warm seawater side as in the case of a reverse osmosis membrane. For example, the polymer solution that has absorbed water and has a concentration decreased to 30 wt %, as shown in FIG. 11, is separated into two phases when cooled to 50° C. or less. Thus, the polymer solution can be separated into fresh water and a concentrated solution of the polymer. Accordingly, the concentrated solution of the polymer can be used as a draw solution for forward osmosis membrane water treatment systems. Further, the polymer is excellent in hydrolytic resistance, and thus it is considered that the polymer can be reused repeatedly over a long period.

Comparative Example 1 NaSS/VBTAC=65/35 molar ratio VBTAC (0.407 g, 1.90 mmol), NaSS (0.82 g, 3.53 mmol, manufactured by Tosoh Finechem Corporation, purity: 88.6%), an initiator V-50 (30.0 mg, 0.11 mmol), a chain transfer agent thioglycerol (55.0 mg, 0.51 mmol), and ion exchange water (23.0 g) were placed in a 100 mL glass four-neck flask fitted with a nitrogen introducing tube, a three-way cock, and a Dimroth condenser and dissolved to prepare a homogeneous solution (monomer molar ratio [VBTAC]/[NaSS]=35/65). After this solution was sufficiently degassed by repeated aspirator pressure reduction and nitrogen introduction, polymerization was conducted under a nitrogen atmosphere with stirring by a magnetic stirrer at 60° C. for 24 hours.

At the completion of the reaction, the polymerization conversion ratio of each monomer was 100%, the number average molecular weight was 1,300, and the weight average molecular weight was 2,400. The polymer was soluble in a gel permeation chromatography (GPC) eluant (sodium sulfate aqueous solution (0.05 mol/L)/acetonitrile=65/35 (volume ratio) solution), and the measurements of the polymerization conversion ratio and the number average molecular weight were calculated from the peak area ratio obtained by GPC.

The polymer solution was a transparent homogeneous solution and did not become clouded even when cooled to 0° C. Thus, it is obvious that the polymer does not exhibit an UCST property.

Comparative Example 2 NaSS/VBTAC=35/65 molar ratio VBTAC (0.62 g, 2.90 mmol), NaSS (0.36 g, 1.56 mmol, manufactured by Tosoh Finechem Corporation, purity: 88.6%), an initiator V-50 (24.5 mg, 0.10 mmol), a chain transfer agent thioglycerol (44.0 mg, 0.41 mmol), and ion exchange water (19.0 g) were placed in a 100 mL glass four-neck flask fitted with a nitrogen introducing tube, a three-way cock, and a Dimroth condenser and dissolved to prepare a homogeneous solution (monomer molar ratio [VBTAC]/[NaSS]=65/35). After this solution was sufficiently degassed by repeated aspirator pressure reduction and nitrogen introduction, polymerization was conducted under a nitrogen atmosphere with stirring by a magnetic stirrer at 60° C. for 24 hours.

At the completion of the reaction, the polymerization conversion ratio of each monomer was 100%, the number average molecular weight was 600, and the weight average molecular weight was 800. The polymer was soluble in a gel permeation chromatography (GPC) eluant (sodium sulfate aqueous solution (0.05 mol/L)/acetonitrile=65/35 (volume ratio) solution), and the measurements of the polymerization conversion ratio and the number average molecular weight were calculated from the peak area ratio obtained by GPC.

The polymer solution was a transparent homogeneous solution at the reaction temperature 60° C. and transparent even when cooled to 0° C. Thus, it is obvious that the polymer does not exhibit an UCST property.

Comparative Example 3 NaSS/4VP=70/30 Molar Ratio

Ion exchange water (60.00 g), 1 N hydrochloric acid (6.39 g, 6.39 mmol), 4VP (0.70 g, 6.39 mmol), NaSS (3.50 g, 15.04 mmol, manufactured by Tosoh Finechem Corporation, purity: 88.6%), a chain transfer agent thioglycerol (60.0 mg, 0.54 mmol), and an initiator V-50 (170.0 mg, 0.61 mmol) were placed in a 100 mL glass four-neck flask equipped with a nitrogen introducing tube, a three-way cock, a Dimroth condenser, and a magnetic stirrer and dissolved to prepare a homogeneous solution (ionic monomer molar ratio [4VP]/[NaSS]=30/70). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 100%, the number average molecular weight was 2,400, and the weight average molecular weight was 4,900.

The polymer solution was a transparent homogeneous solution and did not become clouded even when cooled to 0° C. Thus, it is obvious that the polymer does not exhibit an UCST property.

Comparative Example 4 NaSS/4VP=30/70 molar ratio

Ion exchange water (40.00 g) and 1 N hydrochloric acid (20.08 g, 20.08 mmol) were placed in a 100 mL glass four-neck flask equipped with a nitrogen introducing tube, a three-way cock, a Dimroth condenser, and a magnetic stirrer, and 4VP (2.20 g, 20.09 mmol) was added thereto under ice cooling. After the temperature was allowed to return to normal temperature, NaSS (2.00 g, 8.59 mmol, manufactured by Tosoh Finechem Corporation, purity: 88.6%), a chain transfer agent thioglycerol (50.0 mg, 0.45 mmol), and an initiator V-50 (230.0 mg, 0.82 mmol) were placed and dissolved to prepare a homogeneous solution (monomer molar ratio [4VP]/[NaSS]=70/30). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 100%, the number average molecular weight was 5,400, and the weight average molecular weight was 11,300.

The polymer solution was a transparent homogeneous solution and did not become clouded even when cooled to 0° C. Thus, it is obvious that the polymer does not exhibit an UCST property.

Comparative Example 5 Synthesis and Evaluation of vinyl acetate/N-vinylpyrrolidone Copolymer <Preparation of Copolymer>

A vinyl acetate/N-vinylpyrrolidone copolymer reported as an UCST-type polymer (see U.S. Pat. No. 3,386,912) was prepared.

Vinyl acetate (manufactured by Tokyo Chemical Industry Co., Ltd., purity: 99%, 8.00 g, 92.0 mmol), N-vinylpyrrolidone (manufactured by Tokyo Chemical Industry Co., Ltd., purity: 99%, 12.00 g, 106.9 mmol), an initiator V-601 (manufactured by FUJIFILM Wako Pure Chemical Corporation, 2.100 g, 9.10 mmol), ion exchange water (50.00 g), and 2-propanol (50.00 g) were placed and dissolved in a 300 mL glass four-neck flask equipped with a nitrogen introducing tube, a three-way cock, a Dimroth condenser, and a magnetic stirrer to prepare a homogeneous solution (monomer molar ratio [vinyl acetate]/[N-vinylpyrrolidone]=40/60). After this solution was sufficiently degassed by repeated aspirator pressure reduction and nitrogen introduction, polymerization was conducted under a nitrogen atmosphere with stirring at 70° C. for 20 hours.

At the completion of the reaction, the polymerization conversion ratio of each monomer was 100%, the number average molecular weight was 2,000, and the weight average molecular weight was 8,000.

The polymerization solution was a transparent homogeneous solution but became slightly clouded after 2-propanol was evaporated by a rotary evaporator. Thus, the temperature responsiveness was checked, but it was not possible to measure a distinct transition temperature.

<Measurement of Osmotic Pressure>

A 50 wt % aqueous solution of the polymer described above was prepared (slightly clouded), and measurement of the osmotic pressure at 50° C. resulted in 11 bar, which was lower than that of seawater. For this reason, it is considered to be difficult to use the solution as a draw solution for forward osmosis membrane water treatment systems.

Comparative Example 6 NaSS Homopolymer

Ion exchange water (131.00 g), NaSS (30.01 g, 128.95 mmol, manufactured by Tosoh Finechem Corporation, purity: 88.6%), a chain transfer agent thioglycerol (1.40 g, 12.53 mmol), and an initiator V-50 (1.01 g, 3.61 mmol) were placed in a 300 mL glass four-neck flask equipped with a nitrogen introducing tube, a three-way cock, a Dimroth condenser, and a magnetic stirrer and dissolved to prepare a homogeneous solution. After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio was 100%, the number average molecular weight was 1,400, and the weight average molecular weight was 2,700.

The osmotic pressure of a 50 wt % aqueous solution of the polymer was 119 bar, which was sufficiently higher than that of seawater, but 5 to 50 wt % aqueous solutions did not become clouded even when cooled to 0° C. That is, it is obvious that the polymer did not exhibit an UCST property because of containing no polymerization unit derived from a cationic monomer.

Comparative Example 7 NaSS/2VP Copolymer

Ion exchange water (10.0 g) and 2VP (4.00 g, 36.90 mmol) were placed in a 200 mL glass four-neck flask equipped with a nitrogen introducing tube, a three-way cock, a Dimroth condenser, and a magnetic stirrer, and then 1 N hydrochloric acid (36.90 g, 36.90 mmol) was added thereto under ice cooling to neutralize 2VP. Thereafter, NaSS (8.59 g, 36.91 mmol, manufactured by Tosoh Finechem Corporation, purity: 88.6%), an initiator V-50 (203.0 mg, 0.73 mmol), and a chain transfer agent thioglycerol (105.0 mg, 0.94 mmol) were added thereto (ionic monomer molar ratio [2VP]/[NaSS]=50/50). After this solution was sufficiently degassed by repeated aspirator pressure reduction and nitrogen introduction, polymerization was conducted under a nitrogen atmosphere with stirring at 60° C. for 24 hours.

At the completion of the reaction, the polymerization conversion ratio of each monomer was 99%, the number average molecular weight was 110,000, and the weight average molecular weight was 240,000. The resulting copolymer was a yellowish white heterogeneous solution both during the reaction and during cooling to room temperature. The resulting copolymer, in its original concentration, was heated to 90° C., but the appearance of the copolymer remained that of a yellowish white heterogeneous solution. Thus, it is obvious that the polymer does not exhibit an UCST property.

INDUSTRIAL APPLICABILITY

The novel polystyrene-based polyampholyte of the present invention, which is one of few upper critical solution temperature (UCST)-type thermoresponsive polymers, is expected to be applied in broad applications such as drug delivery systems, gene therapy, bioseparation, bioimaging, catheters, artificial muscles, thermo-optical optical switches, catalysts, dispersants, and draw solutions of forward osmosis membrane method water treatment systems.

The invention claimed is:

1. A polyampholyte whose main chain is a repeating phenylethylene structure having upper critical solution temperature (UCST) thermoresponsiveness, consisting of the following structural unit (A) and the following structural unit (B), a content of the structural unit (A) being 36 to 64 mol % with respect to the total of the structural units (A) and (B):

Structural unit (A):
at least one selected from the group consisting of:
a vinylpyridine structural unit represented by General formula (2)

[Formula 2]

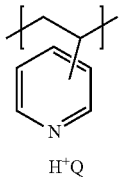

(2)

wherein, in the formula (2), Q represents a halogen ion, OH⁻, HSO$_4^-$, NO$_3^-$, R$_a$SO$_3^-$, or R$_a$CO$_2^-$, and R$_a$ represents an alkyl group having 1 to 3 carbon atoms; and a quaternized vinylpyridine structural unit represented by General formula (3)

[Formula 3]

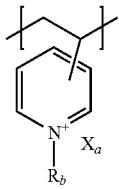

(3)

wherein, in the formula (3), X$_a$ represents a halogen ion or HSO$_4^-$, and R$_b$ represents an alkyl group having 1 to 3 carbon atoms; and Structural unit (B):
General formula (4)

[Formula 4]

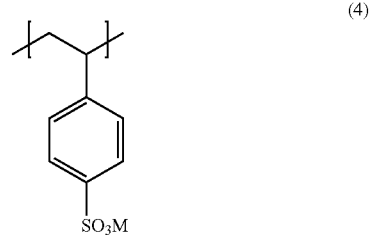

(4)

wherein, in the formula (4), M represents a hydrogen atom, an alkali metal, or an alkali earth metal, wherein a number average molecular weight measured by gel permeation chromatography of the polyampholyte is 500 to 100,000 daltons (Da), and wherein the polyampholyte is a copolymer of an anionic monomer and a cationic monomer.

2. The polyampholyte whose main chain is the repeating phenylethylene structure having the UCST thermoresponsiveness according to claim 1, wherein the polyampholyte dissolves in water at the phase transition temperature or more.

3. A draw solution for a forward osmosis membrane method water treatment system, comprising the polyampholyte whose main chain is the repeating phenylethylene structure having the UCST thermoresponsiveness according to claim 1.

* * * * *